(12) United States Patent
Atsuumi et al.

(10) Patent No.: US 6,417,509 B1
(45) Date of Patent: Jul. 9, 2002

(54) OPTICAL SCANNING APPARATUS AND IMAGE FORMING APPARATUS

(75) Inventors: Hiromichi Atsuumi; Seizo Suzuki, both of Kanagawa (JP)

(73) Assignee: Ricoh Technology Research, Inc., Yokohama (JP)

( * ) Notice: Subject to any disclaimer, the term of this patent is extended or adjusted under 35 U.S.C. 154(b) by 0 days.

(21) Appl. No.: 09/533,063

(22) Filed: Mar. 22, 2000

(30) Foreign Application Priority Data

Mar. 23, 1999 (JP) ............................................ 11-077996
May 20, 1999 (JP) ............................................ 11-140230

(51) Int. Cl.[7] .............................. H01J 3/14; H01J 5/16; H01J 40/14
(52) U.S. Cl. ........................ 250/234; 250/235; 250/236
(58) Field of Search ................................ 250/234, 235, 250/236; 358/481, 474; 359/216, 217, 218; 347/231, 233; 355/53, 55

(56) References Cited

U.S. PATENT DOCUMENTS

| | | | |
|---|---|---|---|
| 5,005,928 A | | 4/1991 | Suzuki |
| 5,122,658 A | * | 6/1992 | Ando .......................... 250/235 |
| 5,233,454 A | | 8/1993 | Sakuma |
| 5,241,174 A | * | 8/1993 | Ando .......................... 250/235 |
| 5,355,244 A | | 10/1994 | Suzuki |
| 5,408,095 A | | 4/1995 | Atsuumi |
| 5,426,298 A | | 6/1995 | Sakuma et al. |
| 5,459,601 A | | 10/1995 | Suzuki |
| 5,475,522 A | | 12/1995 | Itabashi |
| 5,504,613 A | | 4/1996 | Itabashi et al. |
| 5,546,216 A | | 8/1996 | Suzuki |
| 5,684,618 A | | 11/1997 | Atsuumi |
| 5,717,511 A | | 2/1998 | Suzuki |
| 5,875,051 A | | 2/1999 | Suzuki et al. |

FOREIGN PATENT DOCUMENTS

| | | |
|---|---|---|
| JP | 01-177511 | 7/1989 |
| JP | 10-20225 | 1/1998 |

OTHER PUBLICATIONS

RDC–5300 Digital Camera Operation Manual, Ricoh Co., Ltd. Pp 40–41, 44–47, 68–69 and 72–73.

* cited by examiner

Primary Examiner—Robert H. Kim
Assistant Examiner—Courtney Thomas
(74) Attorney, Agent, or Firm—Eugene C. Rzucidlo; Greenberg Traurig LLP

(57) ABSTRACT

An optical scanning apparatus includes a light source for radiating a light beam, an optical scanning system for deflecting the light beam from the light source and condensing the light beam on a surface to be scanned, a detecting device for detecting an image forming state of the light beam scanned by the optical scanning system, and an adjusting mechanism for adjusting the focal position of the light beam on the surface to be scanned. The detecting device includes a very low cost detecting element that can accurately detect an image forming state of the light beam scanned by the optical scanning system independently in a main scanning direction and in a sub scanning direction. While the focal position of the light beam is changed continuously or at a predetermined pitch by the adjusting mechanism, the detecting device monitors the image forming state of the light beam and detects the location and vicinity of a light beam waist position relative to a desired position on the surface to be scanned.

28 Claims, 11 Drawing Sheets

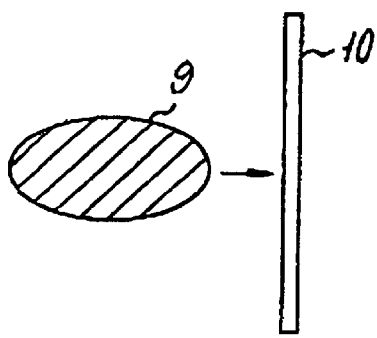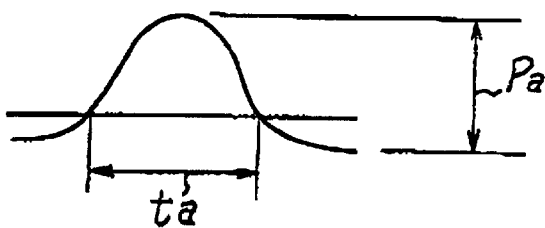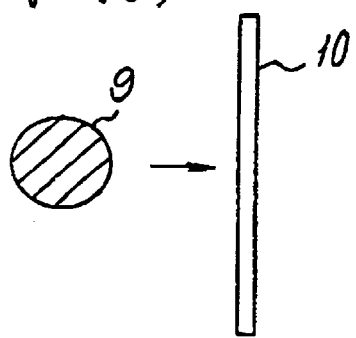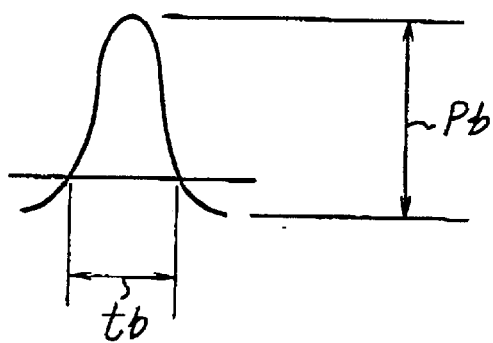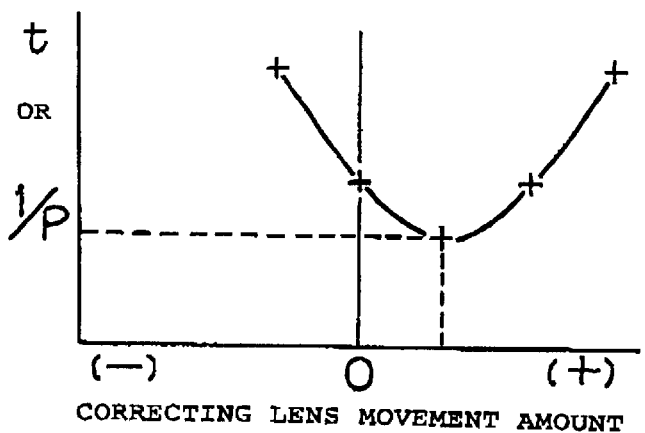

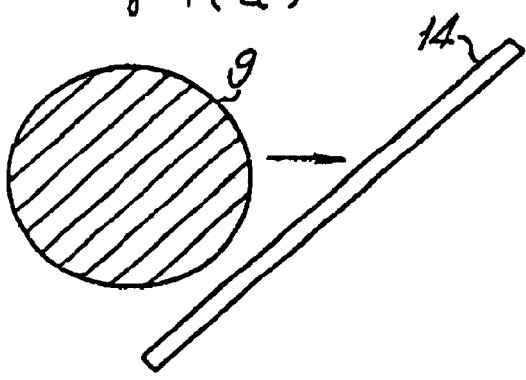
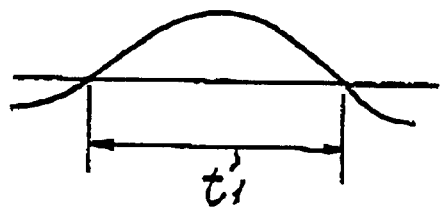
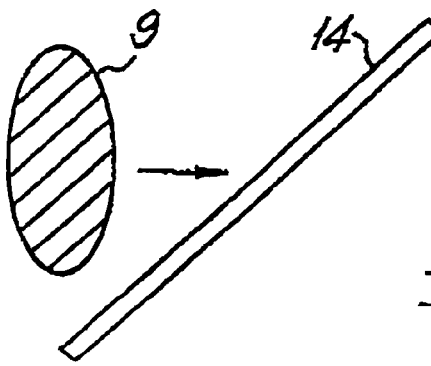
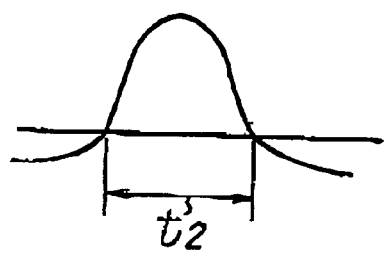
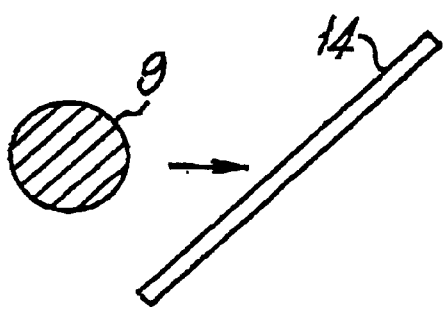
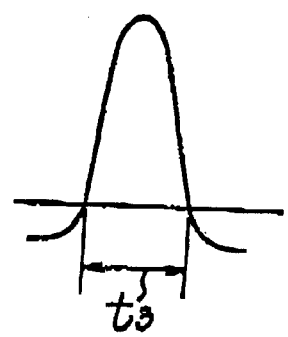

MAIN SCANNING · SUB SCANNING

DIFFERENTIAL

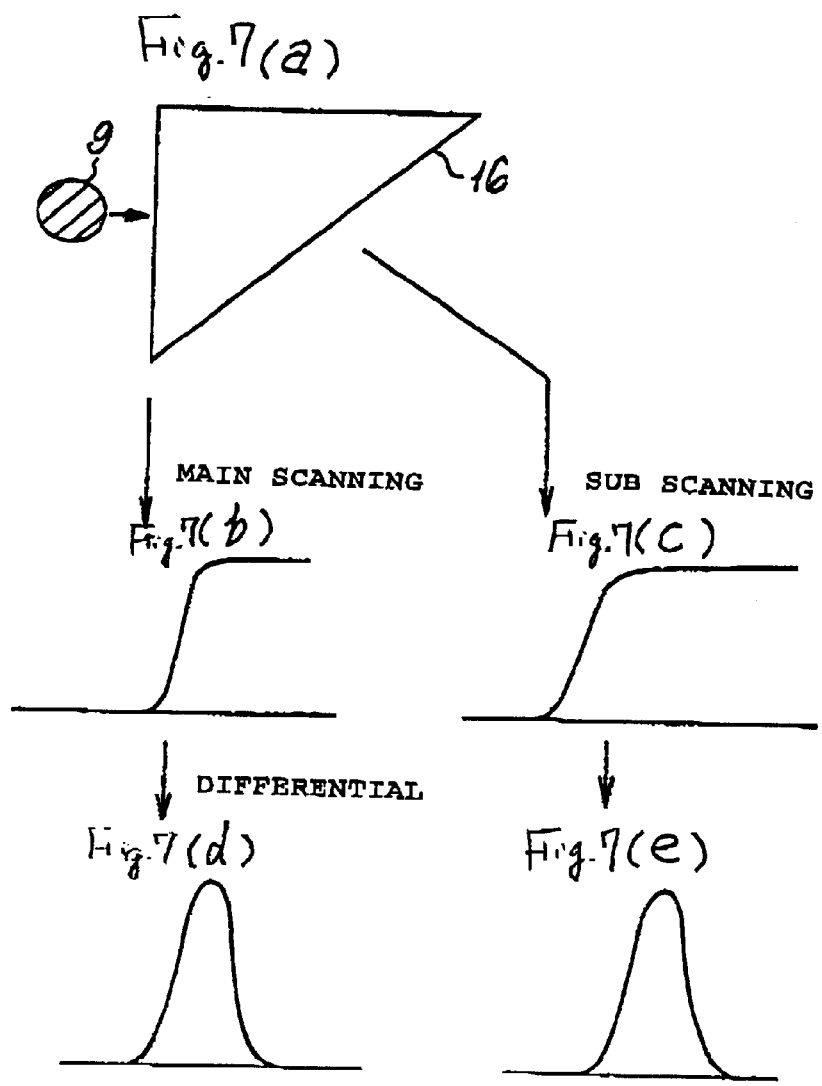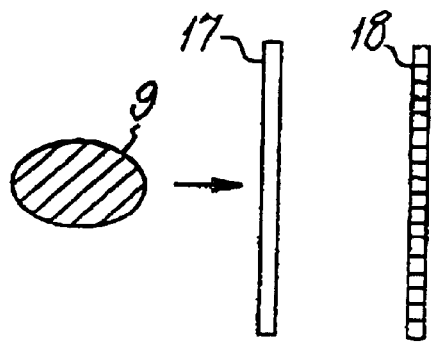

DSPLACEMENT AMOUNT OF CORRECTING LENS SYSTEM

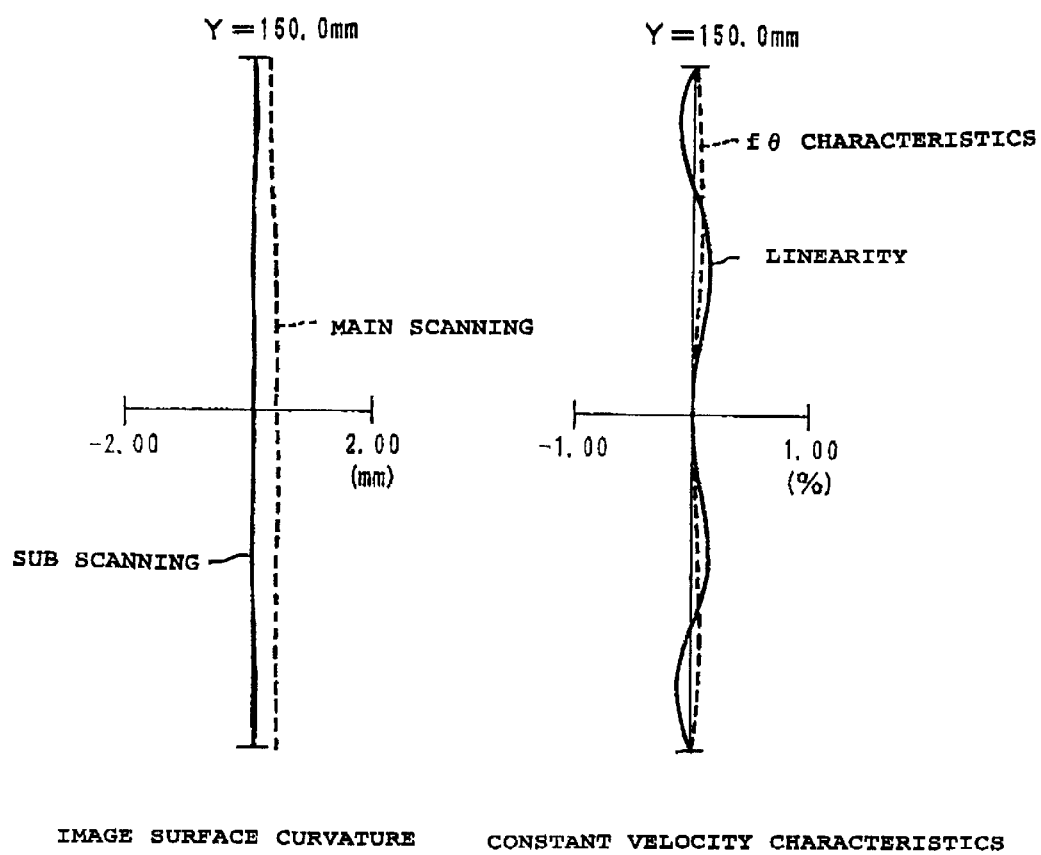

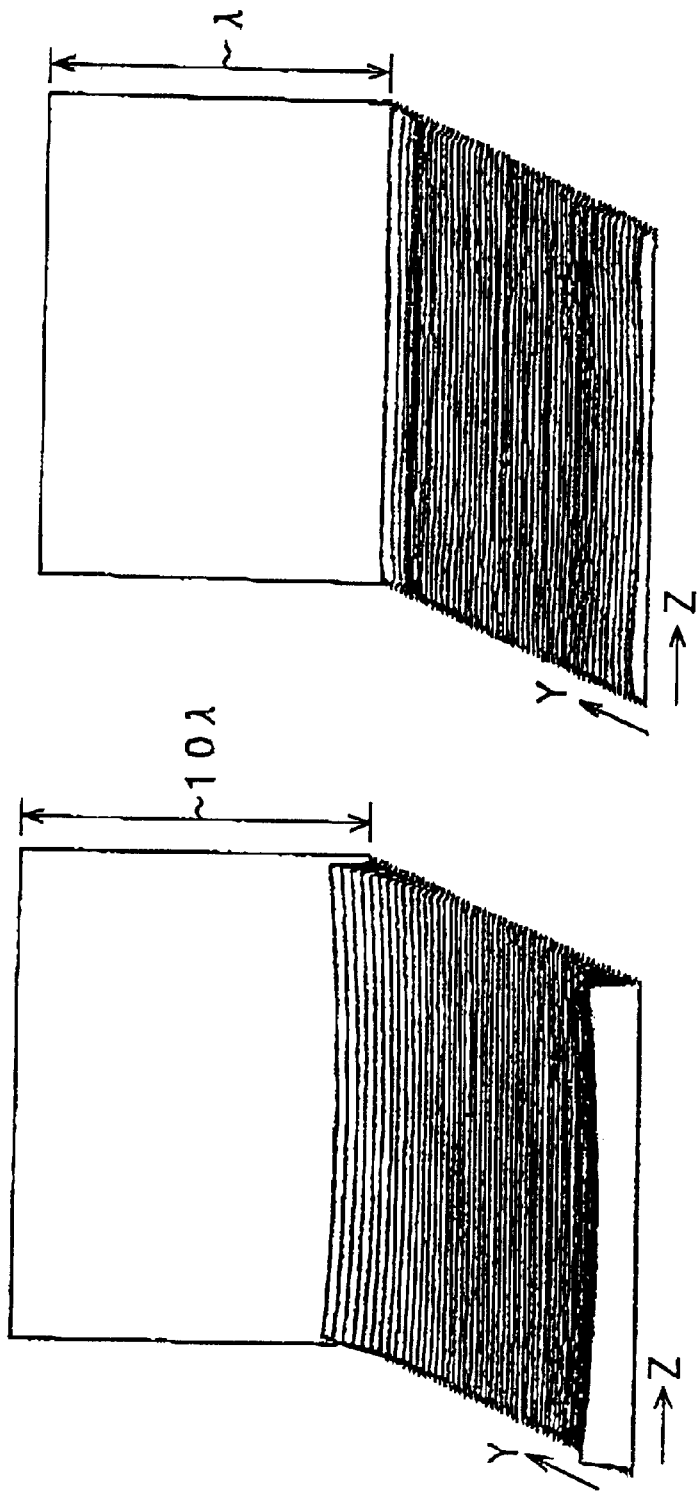
Fig.16(a) TOROIDAL SURFACE USED
Fig.16(b) SPECIAL TOROIDAL SURFACE USED

OPTICAL SCANNING APPARATUS AND IMAGE FORMING APPARATUS

BACKGROUND OF THE INVENTION

The present invention relates to image forming apparatuses, such as digital copying machines, optical printers and other apparatuses capable forming images, and an optical scanning apparatus included in such image forming apparatuses.

DISCUSSION OF RELATED ART

An optical scanning apparatus is known for use in image forming apparatuses such as digital copying apparatuses, optical printers and other such apparatuses. Optical scanning in an optical scanning apparatus is performed by scanning a beam spot by optically forming the beam spot on a surface to be scanned. The diameter of a beam spot is an important factor influencing the quality of an image generated by the scanning process. In order to produce a good quality image, a scanning beam has to be adequately condensed onto the surface to be scanned. Because an optical scanning apparatus generally includes movable portions such as a rotating polygonal mirror for deflecting a light beam from a light source toward the surface to be scanned, the arrangement conditions of an optical system of the optical scanning apparatus is slightly changed by the influence of vibrations or other external environmental factors over time. Moreover, when an optical system includes a plastic lens or similar lens elements which is easily influenced by temperature and humidity, the characteristics of the optical system slightly fluctuate according to changes in the operating environment of the optical scanning apparatus.

If such optical arrangement deviation and optical characteristic fluctuation occurs, the light condensing position (focusing position) of a scanning beam deviates relative to the surface to be scanned, and thereby, the beam spot diameter increases.

Therefore, several attempts have been made to correct the deviation of the focal position of a scanning beam occurring over time or caused by environmental fluctuations.

For example, Japanese Patent Application Laid-Open No. 10-20225 describes an optical scanning apparatus for condensing a laser beam radiated from a laser beam source into an optical beam spot and linearly scanning a surface to be scanned at a substantially constant velocity with the optical beam spot. The optical scanning apparatus includes a focusing lens for adjusting the condensing position of a laser beam radiated from the laser beam source, a detecting device for detecting the passage of a scanned laser beam to generate a detection signal, a pulse emitting device for allowing the laser beam source to emit a pulse at a predetermined time after the generation of the detection signal, a beam condensed state detecting device located at a position that is substantially optically equivalent to the position of the surface to be scanned for detecting the beam condensed state using a knife edge process, and a control device for driving the focusing lens based on the detection result of the beam condensed state detecting device to adjust the condensed position of the laser beam.

Moreover, another optical scanning apparatus is described in Japanese Patent Publication No. 2761723, which includes a light source for emitting a laser beam, a collimator lens for collimating the laser beam emitted from the light source, a photoelectric converting element for receiving a laser beam passed through the collimator lens, and an adjusting device for adjusting the position of the collimator lens in an optical axis direction in accordance with the output of the photoelectric converting element. The adjusting device adjusts the position of the collimator lens in accordance with a difference between a maximum output value and a minimum output value of the photoelectric converting element when receiving the laser beam flickering in response to an image signal.

In the optical scanning apparatus described in Japanese Patent Application Laid-Open No.10-20225, the laser beam source is allowed to emit a pulse from a pulse emitting device, and the beam condensed state is detected by the beam condensed state detecting device located at a position that is substantially optically equivalent to that of the surface to be scanned. However, a pulse emitting timing of the pulse emitting device actually deviates. Therefore, the detection accuracy of the beam condensed state is decreased when such deviation in pulse emitting timings occurs. Moreover, because the beam condensed state is detected by the beam condensed state detecting device using a knife edge process, the beam condensed state of a main scanning direction can be detected, but the beam condensed state of a sub scanning direction cannot be detected.

There is no apparatus or method for detecting the beam condensed states independently in the main scanning direction and in the sub scanning direction in the conventional art.

Moreover, in the optical scanning apparatus described in the Japanese Patent Application Laid-Open No. 10-20225 or Publication No. 2761723, an adjusting mechanism for adjusting a focal position adjusts the focusing lens or the collimator lens in the optical axis direction. Accuracy is required for the positional relationship between the light source and the focusing lens or the collimator lens. Also, an optical axis deviation or the like occurs when the focusing lens or the collimator lens is displaced for adjusting the focal position. Therefore, it is actually difficult to adjust the focusing lens or the collimator lens.

Furthermore, even when the focusing lens or the collimator lens is adjusted in the optical axis direction, the focal position cannot necessarily be corrected in the main and sub scanning directions at the same time. Particularly, in an optical scanning apparatus, the magnification of an optical system disposed on the optical path leading to a surface to be scanned from a light source often differs in the main scanning direction and in the sub scanning direction, for example, because of surface tilt correction for a rotating polygonal mirror functioning as a deflector for deflecting a light beam from a light source toward a surface to be scanned. In this case, even if the position of a collimating lens is adjusted in the optical axis direction, the focal position deviation of the main scanning direction and sub scanning direction cannot simultaneously be corrected.

The prior art method which includes using a knife edge process can only detect a beam condensed state in the main scanning direction and can not detect the beam condensed state in the sub scanning direction. Also, only a single pulse at a time is detected in the knife edge process so that the detection accuracy is relatively low. Further, the knife edge process requires the use of at least two pixels to achieve detection of the beam condensed state.

The other conventional apparatus which uses a line CCD for detecting a beam condensed state on a surface to be scanned is capable of more accurate detection of the beam condensed state, but is very expensive due to the cost of the line CCD and requires many pixels to achieve the detection. Furthermore, the line CCD can only detect the beam condensed state in the sub scanning direction and can not detect the beam condensed state in the main scanning direction.

Another conventional method uses an area CCD to detect the beam condensed state. Similar to the line CCD, the area CCD is very expensive and requires even more pixels to detect the beam condensed state. Also, the area CCD uses only a single pulse to detect the condensed state of the beam spot which has limited detection accuracy.

SUMMARY OF THE INVENTION

In order to overcome the above-described and other problems, preferred embodiments of the present invention provide a novel optical scanning apparatus which greatly improves the detection accuracy of an image forming state of a light beam.

The preferred embodiments of the present invention further provide a novel optical scanning apparatus which more accurately detects the location of a waist position of a light beam using an inexpensive element.

The preferred embodiments of the present invention further provide a novel optical scanning apparatus which detects the location of a waist position of a light beam using an inexpensive element independently in the main scanning direction and the sub scanning direction.

The preferred embodiments of the present invention further provide a novel optical scanning apparatus which detects the location of a waist position of a light beam using a single pixel which is less expensive than prior art apparatuses and using a continuous pulse which is more accurate than the single pulse process used in the prior art, to accurately and precisely detect the waist position in the main scanning and the sub scanning directions for more accurate and complete information about the waist position.

Further, preferred embodiments of the present invention provide a novel optical scanning apparatus which prevents deterioration of a detection accuracy attributed to a light quantity dispersion on a detecting device by a reflectance dispersion of each surface of a polygonal mirror.

Other preferred embodiments of the present invention provide a novel optical scanning apparatus which easily and securely corrects the above-described focal position deviation of a scanning beam attributed to environmental changes, and other influencing factors.

According to a preferred embodiment of the present invention, an optical scanning apparatus includes a light source for radiating a light beam, an optical scanning system for deflecting the light beam from the light source and condensing the light beam on a surface to be scanned, a detecting device for detecting an image forming state of the light beam scanned by the optical scanning system, and an adjusting mechanism for adjusting the focal position of the light beam on the surface to be scanned. While the focal position of the light beam is changed continuously or at a predetermined pitch by the adjusting mechanism, the detecting device monitors the image forming state of the light beam and detects the location and vicinity of a light beam waist position relative to a desired position on the surface to be scanned.

According to another preferred embodiment of the present invention, in the above-described optical scanning apparatus, the adjusting mechanism includes an adjusting device for adjusting the focal position of the light beam independently in at least one of a main scanning direction and a sub scanning direction.

According to another preferred embodiment of the present invention, in the above-described optical scanning apparatuses, the detecting device detects the vicinity of the waist position of the light beam independently in the main scanning direction and the sub scanning direction.

According to another preferred embodiment of the present invention, in the above-described optical scanning apparatuses, the detecting device is configured to have an opening in the main scanning direction, and the opening may be inclined by using the light beam incident upon the detecting device as a rotation axis.

According to still another preferred embodiment of the present invention, in the above-described optical scanning apparatuses, a deflecting device for deflecting a light beam from the light source includes a polygonal mirror, and the deflecting device uses a common deflecting surface in one cycle of detecting the image forming state of the light beam.

According to other preferred embodiments of the present invention, an optical scanning apparatus includes a light source, a coupling lens, an optical scanning system, and a correcting/adjusting device. The light source radiates a light flux for optical scanning. As the light source, a semiconductor laser can preferably be used. The coupling lens converts the light flux radiated from the light source to a parallel light flux or a converged light flux or a divergent light flux. The optical scanning system deflects the light flux converted by the coupling lens, and condenses the deflected scanning beam onto a surface to be scanned. Therefore, the optical scanning system has an optical deflector for deflecting the light flux from the coupling lens, and a scanning image forming optical system for condensing a scanning beam deflected by the optical deflector on the surface to be scanned. As the optical deflector, a rotating polygonal mirror, a rotating two-plane mirror, a rotating single-plane mirror, and other such mirrors can preferably be used. The scanning image forming optical system can be constituted by a single lens or a plurality of lenses, or by an image forming mirror, or by an image forming mirror and one or more lenses.

The correcting/adjusting device corrects and adjusts the focal position deviation of the scanning beam on the surface to be scanned caused by environmental fluctuations and other factors, and includes an optical correcting system.

The optical correcting system is preferably located between the coupling lens and a deflecting surface of the deflector in the optical scanning system, and has at least one anamorphic surface which has different power in the main scanning direction and in the sub scanning direction. The optical element constituting the optical correcting system can be constituted by a lens or a mirror.

The optical correcting system can also function as an optical system for correcting the surface tilt of the deflector and for forming a light flux from the coupling lens into an image substantially linear in the main scanning direction in the vicinity of a deflecting surface of the deflector. A dedicated optical system for correcting the surface tilt of the deflector other than the optical correcting system can be used.

According to another preferred embodiment of the present invention, in the immediately above-described optical scanning apparatus, the correcting/adjusting device can include a beam spot detecting device, a displacing mechanism, and a control device, in addition to the optical correcting system.

The beam spot detecting device detects the condensed state of a scanning beam, or the beam spot diameter or the amount of light corresponding to the beam spot diameter in a position substantially equivalent to the surface to be scanned, and determines the degree of a focal position deviation.

The displacing mechanism displaces one or more optical elements constituting the optical correcting system in an optical axis direction. When there are two or more optical elements to be independently displaced in the optical correcting system, each optical element is provided with the displacing mechanism. As the displacing mechanism, a heretofore known appropriate linear displacing mechanism using for example, a rack and pinion, a screw rod, or other such moving mechanism, can be preferably used.

The control device controls the displacing mechanism in accordance with a detection result of the beam spot detecting device, and corrects/adjusts the focal position deviation of a scanning beam on the surface to be scanned.

According to still another preferred embodiment of the present invention, in the immediately above-described optical scanning apparatuses, the correcting/adjusting device can be constituted to adjust the focal position in at least one of the main scanning direction and the sub scanning direction, to independently adjust the focal positions with respect to the main scanning direction and the sub scanning direction, or to simultaneously adjust the focal positions of the main scanning direction and the sub scanning direction.

When the correcting/adjusting device is arranged to adjust the focal position in at least one of the main scanning direction and the sub scanning direction, the optical correcting system may include a cylindrical lens which has a power in the main scanning direction or in the sub scanning direction, and the cylindrical lens can be displaced in the optical axis direction by the displacing mechanism.

When the correcting/adjusting device is arranged to independently adjust the focal positions with respect to the main scanning direction and the sub scanning direction, a lens for converting a light flux from the light source to a condensed light flux may be used as the coupling lens. Also, the optical correcting system may include a concave cylindrical lens having a negative power in the main scanning direction and a convex cylindrical lens having a positive power in the sub scanning direction. The displacing mechanism may be arranged to displace the concave cylindrical lens and the convex cylindrical lens independent of each other in the optical axis direction. Moreover, the optical scanning apparatus can be constructed so that a lens for converting a light flux from the light source to a divergent light flux is used as the coupling lens, the optical correcting system includes a convex cylindrical lens having a positive power in the main scanning direction and a convex cylindrical lens having a positive power in the sub scanning direction, and the displacing mechanism displaces the convex cylindrical lenses independent of each other in the optical axis direction.

When the correcting/adjusting device is arranged to simultaneously adjust the focal positions of the main scanning direction and the sub scanning direction, the optical correcting system may include a toroidal lens having a toroidal surface which is concave in the main scanning direction and convex in the sub scanning direction, and the displacing mechanism may be configured to displace the toroidal lens in the optical axis direction.

According to still another preferred embodiment of the present invention, in the above-described optical scanning apparatuses, the optical correcting system may have at least one special toroidal surface in order to effectively correct a wave-front aberration.

In recent years, the density of writing by optical scanning has been advanced, and a high-density writing exceeding 1200 dpi is being used. In order to accomplish the high-density writing, the beam spot diameter needs to be reduced, and a high NA is necessary for the optical system. However, when the high NA is realized, the beam diameter of a light flux flowing through the optical system is enlarged, and the wave-front aberration generated during the passage through the optical system largely influences the beam spot diameter. If such wave-front aberration is too large, the beam spot cannot be converted to a required small diameter.

In the optical scanning apparatus of preferred embodiments of the present invention, when the optical correcting system includes at least one special toroidal surface having a non-arc shape in the main scanning direction and/or the sub scanning direction, the wave-front aberration is effectively corrected, and a small-diameter beam spot is achieved reliably and continuously.

Other features, elements, characteristics and advantages of the present invention will become more apparent from the following detailed description of preferred embodiments thereof with reference to the attached drawings.

BRIEF DESCRIPTION OF THE DRAWINGS

A more complete appreciation of the present invention and many of the attendant advantages thereof will be readily obtained as the same becomes better understood by reference to the following detailed description of preferred embodiments thereof when considered in conjunction with accompany drawings, wherein:

FIGS. 2(a) to 2(d) are explanatory views of an operation of detecting an image forming state of a light beam according to a first preferred embodiment of the present invention;

FIG. 3 is a characteristic curve diagram showing a relation between a detecting signal indicative of an image forming state of a light beam and a correcting lens movement amount according to the first preferred embodiment of the present invention;

FIGS. 4(a) to 4(f) are explanatory views of an operation of detecting an image forming state of a light beam according to a second preferred embodiment of the present invention;

FIGS. 6(a) to 6(e) are explanatory views of an operation of detecting an image forming state of a light beam according to a fourth preferred embodiment of the present invention when the main scanning direction waist position and the sub scanning direction waist position of the light beam is not located on the surface to be scanned;

FIGS. 7(a) to 7(e) are explanatory views of an operation of detecting an image forming state of a light beam according to the fourth preferred embodiment of the present invention when the main scanning direction waist position and the sub scanning direction waist position of the light beam are located on the surface to be scanned;

FIG. 8 is an explanatory schematic view of an operation of detecting an image forming state of a light beam according to a fifth preferred embodiment of the present invention;

FIG. 15 is a diagram showing an image surface curvature and a constant velocity characteristics of an example of an optical system according to a preferred embodiment of the present invention; and FIGS. 16(a) and 16(b) are explanatory views showing a wave-front aberration correcting effect by using a special toroidal surface.

DETAILED DESCRIPTION OF PREFERRED EMBODIMENTS

Figure 1:
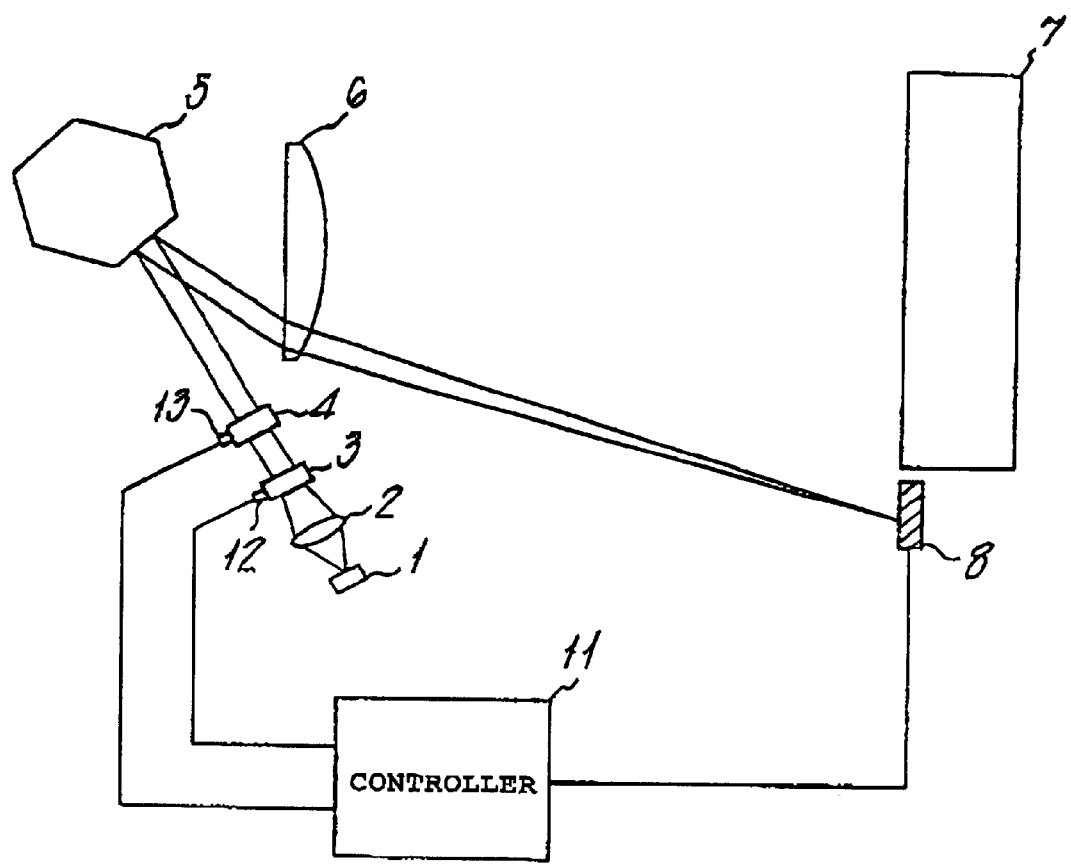
FIG. 1 is a schematic view showing a preferred embodiment of an optical scanning apparatus according to the present invention.

FIG. 1 illustrates a first preferred embodiment of an optical scanning apparatus according to the present invention. As a light source 1 for radiating a light beam, for example, a laser light source is preferably used. The light source 1 is driven in response to an image signal input by a driving device (not shown). The light beam from the laser source 1 is converted to a substantially parallel light flux or a slightly divergent or a slightly convergent light flux by a coupling lens 2, transmitted through correcting lenses 3, 4, and deflected by a deflecting device 5. FIG. 1 illustrates an example in which the light beam is converted to a slightly convergent light flux. The deflecting device 5 includes a deflector defined by, for example, a polygonal mirror. The polygonal mirror is rotated by a motor to scan the light beam from the correcting lens 4.

The light beam from the polygonal mirror 5 is formed into an optical beam spot on a surface to be scanned 7 of a photosensitive member which preferably includes a photosensitive drum or other such photoconductor, by a fθ lens 6. The surface to be scanned 7 is repeatedly scanned linearly in a main scanning direction by the light beam from the fθ lens 6, while being moved in a sub scanning direction by a driving device (not shown). The surface to be scanned 7 is thus exposed with the light beam having an exposure distribution in response to an image signal, and an image is formed on the surface to be scanned 7, for example, in an electrophotographic process. Specifically, after the surface to be scanned 7 is uniformly charged by a charging device (not shown) and exposed to the light beam from the fθ lens 6, an electrostatic image is formed, developed by a developing device (not shown), and the developed image is then transferred to a transfer material by a transfer device (not shown).

Here, the polygonal mirror 5 and the fθ lens 6 constitute an optical scanning system for deflecting a light beam from the laser source 1 to condense the light beam on the surface to be scanned 7. The correcting lens 3 is an element arranged to adjust the focal position of the light beam in the main scanning direction, and preferably includes a cylindrical lens which has a power only in the main scanning direction, or other suitable lens elements. The correcting lens 4 is an element arranged to adjust the focal position of the light beam in the sub scanning direction, and preferably includes a cylindrical lens which has a power only in the sub scanning direction, or other suitable lens elements.

A detecting device 8 is located at a position that is substantially optically equivalent to the position of the surface to be scanned 7, and is arranged to receive the light beam scanned by the polygonal mirror 5 via the fθ lens 6 outside the effective scanning area of the surface to be scanned 7 to detect an image forming state of the light beam.

The detecting device 8 includes a main scanning direction image forming state detecting device (not shown) to detect the image forming state of the main scanning direction of the light beam 9 from the fθ lens 6. The main scanning direction image forming state detecting device is constituted by disposing a plate having an opening 10, as illustrated for example in FIG. 2(a), on a photodiode defining a light receiving element for detecting the image forming state of the main scanning direction. The opening 10 has a constant width in the main. scanning direction, which is smaller than the diameter of the light beam 9 in the main scanning direction, and has a predetermined length in the sub scanning direction, which is sufficiently larger than the diameter of the light beam 9 in the sub scanning direction.

When the light beam 9 from the fθ lens 6 scans on the plate, the light beam is received for example by the photodiode for detecting the image forming state of the main scanning direction via the opening 10 of the plate, and a light receiving signal is obtained from the photodiode. The light receiving signal from the photodiode for detecting the main scanning direction image forming state is input to a controller 11 functioning as a control device.

Moreover, a mechanism 12 for moving the correcting lens 3 in an optical axis direction, and a mechanism 13 for moving the correcting lens 4 in the optical axis direction are provided. When a time interval in which the light receiving signal from the photodiode for detecting the main scanning direction image forming state is set at a predetermined threshold level (i.e., a time interval from when the light receiving signal exceeds the threshold level until the light receiving signal is decreased to a point below the threshold level) is represented by "ta" and the peak value of the light receiving signal from the photodiode for detecting the main scanning direction image forming state is represented by "Pa", when the main scanning direction waist position of the light beam 9 from the fθ lens 6 is not incident on the surface to be scanned 7, a thick light beam from the fθ lens 6 is received by the photodiode for detecting the main scanning direction image forming state through the opening 10 of the plate, as illustrated in FIG. 2(a), and the light receiving signal from the photodiode for detecting the main scanning direction image forming state forms a waveform as illustrated in FIG. 2(b).

Furthermore, when the main scanning direction waist position of the light beam 9 from the fθ lens 6 is incident on the surface to be scanned 7, when the time interval in which the light receiving signal from the photodiode for detecting the main scanning direction image forming state is set at the predetermined threshold level is represented by "tb" and the peak value of the light receiving signal from the photodiode for detecting the main scanning direction image forming state is represented by "Pb", a thin light beam from the fθ lens 6 is received by the photodiode for detecting the main scanning direction image forming state through the opening 10 of the plate, as illustrated in FIG. 2(c), and the light receiving signal from the photodiode for detecting the main scanning direction image forming state forms a waveform as illustrated in FIG. 2(d), and thereby the relationships ta>tb and Pa<Pb are obtained.

That is, when a time interval in which a light receiving signal from a photodiode for detecting a main scanning direction image forming state is set at a predetermined threshold level (i.e., a time interval from when a light receiving signal exceeds a threshold level until the light receiving signal is decreased to a point below the threshold level) is represented by "t" and a peak value of the light receiving signal from the photodiode for detecting the main scanning direction image forming state is represented by "P", as illustrated in FIG. 3, t or 1/P changes in accordance with the movement amount of the correcting lens 3 in the optical axis direction.

An operation of the controller 11 will be described next. When the correcting lens 3 is moved in the optical axis direction continuously or at a predetermined pitch when the power is turned on or during an interval of forming images on the surface to be scanned 7 by the electrophotographic process, the light receiving signal (t or P) is output from the detecting device 8 in accordance with the movement amount of the correcting lens 3, and data forming a graph as illustrated in FIG. 3 is obtained and stored in the controller 11. Subsequently, the optimum movement amount of the correcting lens 3 by which the beam waist position is incident on the surface to be scanned 7 is calculated from this data, and the correcting lens 3 is moved according to the calculated movement amount.

As described above, according to the first preferred embodiment according to the present invention, an optical scanning apparatus includes the light source 1 for radiating a light beam, the optical scanning systems 5, 6 for deflecting the light beam from the light source 1 and condensing the light beam on the surface to be scanned 7, the detecting device 8 for detecting the image forming state of the light beam scanned by the optical scanning systems 5, 6, and the controller 11 and the mechanism 12 defining an adjusting mechanism for adjusting the focal position of the light beam on the surface to be scanned 7. In this optical scanning apparatus, the focal position of a light beam is changed continuously or at a predetermined pitch by the adjusting mechanisms 11, 12, the image forming state of the light beam is monitored by the detecting device 8, and the vicinity of the light beam waist position is detected by the detecting device 8, so that the detection accuracy of the light beam image forming state is greatly improved.

A second preferred embodiment of an optical scanning apparatus according to the present invention will now be described. According to the second preferred embodiment, the detecting device 8 is configured so as to detect the waist position of a light beam independently in the main scanning direction and the sub scanning direction. Further, there is provided an image forming state detecting device which detects the image forming state of the light beam 9 from the fθ lens 6 in the main scanning direction and the sub scanning direction, respectively. The image forming state detecting device preferably includes a plate having an opening 14 as illustrated for example in FIG. 4(a) on a light receiving element such as a photodiode for detecting the image forming state of a light beam. The plate having the opening 14 is obliquely disposed with respect to the main and sub scanning directions as illustrated in FIG. 4(a), for example. The opening 14 has a constant width smaller than the diameters of the light beam 9 in the main and sub scanning directions and a predetermined length sufficiently larger than the diameters of the light beam 9 in the main and sub scanning directions. The opening 14 of the plate is inclined by using a light beam incident upon the detecting device 8 as the rotation axis.

When the light beam 9 from the fθ lens 6 scans on the plate, the light beam 9 is received by the image forming state detecting photodiode via the opening 14 of the plate, and a light receiving signal is obtained from the photodiode for detecting the image forming state. The light receiving signal from the image forming state detecting photodiode is input to the controller 11. When a time interval in which a light receiving signal from the image forming state detecting photodiode is set at a predetermined threshold level (i.e., a time interval from when a light receiving signal exceeds a threshold level until the light receiving signal is decreased to a point below the threshold level) is represented by "t" and a peak value of the light receiving signal from the image forming state detecting photodiode is represented by "P", t or 1/P changes in accordance with the movement amount of the correcting lens 3 in the optical axis direction, and in accordance with the movement amount of the correcting lens 4 in the optical axis direction.

When the main scanning direction waist position and the sub scanning direction waist position of the light beam from the fθ lens 6 are not incident on the surface to be scanned 7, and when the time interval in which a light receiving signal from the image forming state detecting photodiode is set at a predetermined threshold level (i.e., the time interval from when the light receiving signal exceeds the threshold level until the light receiving signal is decreased to a point below the threshold level) is represented by t1, a thick light beam 9 from the fθ lens 6 is received by the image forming state detecting photodiode through the opening 14 of the plate, as illustrated in FIG. 4(a), and the light receiving signal from the image forming state detecting photodiode forms a waveform as illustrated in FIG. 4(b).

The operation of the controller 11 will be described next. When the correcting lens 3 is moved in the optical axis direction continuously or at a predetermined pitch when the power is turned on or during an interval of forming images on the surface to be scanned 7 by the electrophotographic process, the light receiving signal (t or P) is output from the detecting device 8 in accordance with the movement amount of the correcting lens 3, and data forming a graph as illustrated in FIG. 3 is obtained and stored in the controller 11. Subsequently, the optimum movement amount of the correcting lens 3 by which the beam waist position is incident on the surface to be scanned 7 is calculated from this data, and the correcting lens 3 is moved according to the calculated movement amount. The focal position of the main scanning direction is first adjusted, and then the focal position of the sub scanning direction is adjusted. The order of adjusting the main scanning direction focal position and the sub scanning direction focal position may be reversed.

When the main scanning direction waist position and the sub scanning direction waist position are incident on the surface to be scanned 7, as illustrated in FIG. 4(e), a thin light beam 9 from the fθ lens 6 is received by the image forming state detecting photodiode through the opening 14 of the plate, and the light receiving signal from the image forming state detecting photodiode forms a waveform as illustrated in FIG. 4(f).

Figure 5:
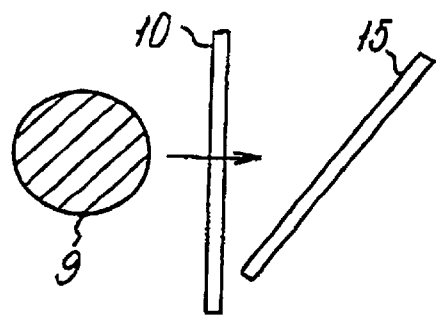
FIG. 5 is an explanatory view of an operation of detecting an image forming state of a light beam according to a third preferred embodiment of the present invention.

FIG. 5 illustrates a portion of a third preferred embodiment of an optical scanning apparatus according to the present invention. According to the third preferred embodiment, the detecting device 8 includes a main scanning direction image forming state detecting device and a sub scanning direction image forming state detecting device, and the light beam waist position is detected independently in the main scanning direction and the sub scanning direction.

The sub scanning direction image forming state detecting device preferably includes a plate having an opening 15 similar to the opening 14 of the image forming state detecting device of the second preferred embodiment and located on a light receiving element such as a photodiode for detecting the sub scanning direction image forming state, and the plate having the opening 15 is inclined by using a light beam incident on the detecting device 8 as the rotation axis.

When the light beam 9 from the fθ lens 6 scans on the plate of the sub scanning direction image forming state detecting device, the light beam 9 is received by the sub scanning direction image forming state detecting photodiode via the opening 15 of the plate, and a light receiving signal is obtained from the sub scanning direction image forming state detecting photodiode. The light receiving signal from the sub scanning direction image forming state detecting photodiode is input to the controller 11.

The main scanning direction image forming state detecting device also preferably includes a plate having an opening 15 similar to the opening 14 of the image forming state detecting device of the second preferred embodiment and disposed on a light receiving element such as a photodiode for detecting the main scanning direction image forming state, and the plate having the opening 15 is inclined by using a light beam incident on the detecting device 8 as the rotation axis.

When the light beam 9 from the fθ lens 6 scans on the plate of the main scanning direction image forming state detecting device, the light beam 9 is received by the main scanning direction image forming state detecting photodiode via the opening 15 of the plate, and a light receiving signal is obtained from the main scanning direction image forming state detecting photodiode. The light receiving signal from the main scanning direction image forming state detecting photodiode is input to the controller 11.

When the main scanning direction waist position and the sub scanning direction waist position of the light beam from the fθ lens 6 are not incident on the surface to be scanned 7, and when the time interval in which a light receiving signal from the image forming state detecting photodiode is set at a predetermined threshold level (i.e., the time interval from when the light receiving signal exceeds the threshold level until the light receiving signal is decreased to a point below the threshold level) is represented by t1, a thick light beam 9 from the fθ lens 6 is received by the image forming state detecting photodiode through the opening 15 of the plate, as illustrated in FIG. 5.

When the correcting lens 3 is moved in the optical axis direction continuously or at a predetermined pitch when the power is turned on or during an interval of forming images on the surface to be scanned 7 by the electrophotographic process, the light receiving signal (t or P) is output from the detecting device 8 in accordance with the movement amount of the correcting lens 3, and data forming a graph as shown in FIG. 3 is obtained and stored in the controller 11. Subsequently, the optimum movement amount of the correcting lens 3 by which the beam waist position is incident on the surface to be scanned 7 is calculated from the data, and the correcting lens 3 is moved according to the calculated movement amount. The focal position of the main scanning direction is first adjusted, and then the focal position of the sub scanning direction is adjusted. The order of adjusting the main scanning direction focal position and the sub scanning direction focal position may be reversed.

A fourth preferred embodiment of an optical scanning apparatus according to the present invention will now be described. According to the fourth preferred embodiment, the detecting device 8 includes a plate having a substantially triangular opening 16 as illustrated in FIG. 6(a) and is disposed on a light receiving element such as a photodiode for detecting the image forming state, and the opening 16 of the plate is inclined by using a light beam incident upon the detecting device 8 as the rotation axis.

Figure 6A:
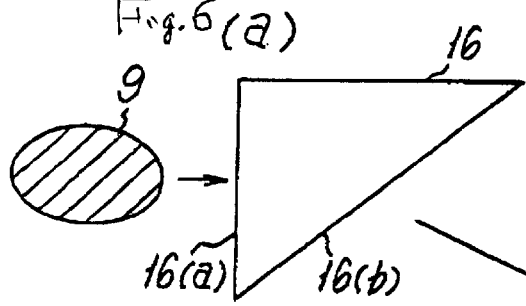

When the main scanning direction waist position and the sub scanning direction waist position of the light beam 9 from the fθ lens 6 are not incident on the surface to be scanned 7 as illustrated in FIG. 6(a), and when the light beam 9 from the fθ lens 6 scans on the plate in the main scanning direction, the light beam 9 is received by the image forming state detecting photodiode via the opening 16 of the plate, and a light receiving signal as illustrated in FIG. 6(b) is obtained from the image forming state detecting photodiode. When the light receiving signal from the image forming state detecting photodiode is differentiated, the signal is obtained as illustrated in FIG. 6(d). Moreover, when the light beam 9 from the fθ lens 6 scans on the plate in the sub scanning direction, the light beam 9 is received by the image forming state detecting photodiode via the opening 16 of the plate, and a light receiving signal as illustrated in FIG. 6(c) is obtained from the image forming state detecting photodiode. When the light receiving signal from the image forming state detecting photodiode is differentiated, the signal is obtained as illustrated in FIG. 6(e).

When the main scanning direction waist position and the sub scanning direction waist position of the light beam 9 from the fθ lens 6 are incident on the surface to be scanned 7, as illustrated in FIG. 7(a), and when the light beam 9 from the fθ lens 6 scans on the plate in the main scanning direction, the light beam 9 is received by the image forming state detecting photodiode via the opening 16 of the plate, and a light receiving signal as illustrated in FIG. 7(b) is obtained from the image forming state detecting photodiode. When the light receiving signal from the image forming state detecting photodiode is differentiated, the signal is obtained as illustrated in FIG. 7(e). Moreover, when the light beam 9 from the fθ lens 6 scans on the plate in the sub scanning direction, the light beam 9 is received by the image forming state detecting photodiode via the opening 16 of the plate, and a light receiving signal as illustrated in FIG. 7(c) is obtained from the image forming state detecting photodiode. When the light receiving signal from the image forming state detecting photodiode is differentiated, the signal is obtained as illustrated in FIG. 7(e).

When the time interval in which a light receiving signal from the image forming state detecting photodiode is differentiated and set at a predetermined threshold level (i.e., a time interval from when the differentiated light receiving signal exceeds the threshold level until the differentiated light receiving signal is decreased to a point below the threshold level) is represented by "t" and a peak value of the differentiated light receiving signal from the image forming state detecting photodiode is represented by "P", t or 1/P changes in accordance with the movement amount of the correcting lens 3 in the optical axis direction, and in accordance with the movement amount of the correcting lens 4 in the optical axis direction.

The operation of the controller 11 will now be described. When the correcting lens 3 is moved in the optical axis direction continuously or at a predetermined pitch when the power is turned on or during an interval of forming images on the surface to be scanned 7 by the electrophotographic process, the light receiving signal (t or P) is output from the detecting device 8 in accordance with the movement amount, and data forming a graph as illustrated in FIG. 3 is obtained and stored in the controller 11. Subsequently, the optimum movement amount of the correcting lens 3 by which the beam waist position is incident on the surface to be scanned 7 is calculated from this data, and the correcting lens 3 is moved according to the calculated moving amount.

A fifth preferred embodiment of an optical scanning apparatus according to the present invention will next be described. According to the fifth preferred embodiment, as illustrated in FIG. 8, the detecting device 8 preferably includes a photodiode slit 17 for detecting the main scanning direction image forming state and a line CCD 18 for detecting the sub scanning direction image forming state. The light beam 9 from the fθ lens 6 is received by the photodiode via the slit 17 and by the line CCD 18, and light receiving signals from the photodiode 17 and the CCD 18 are input to the controller 11.

When the correcting lens 3 is moved in the optical axis direction continuously or at a predetermined pitch when the power is turned on or during an interval of forming images on the surface to be scanned 7 by the electrophotographic process, the light receiving signal (t or P) is output from the photodiode 17 of the detecting device 8 in accordance with the movement amount, and data forming a graph as shown in FIG. 3 is obtained and stored in the controller 11. Subsequently, the optimum movement amount of the correcting lens 3 by which the beam waist position is incident on the surface to be scanned 7 is calculated from this data, and the correcting lens 3 is moved according to the calculated moving amount.

Further, when the correcting lens 4 is moved in the optical axis direction continuously or at a predetermined pitch when the power is turned on or during an interval in which an image is not formed on the surface to be scanned 7 by the electrophotographic process, the light receiving signal (t or P) is output from the CCD 18 of the detecting device 8 in accordance with the movement amount, and data forming a graph as shown in FIG. 3 is prepared and stored in the controller 11. Subsequently, the optimum movement amount of the correcting lens 4 by which the beam waist position is incident on the surface to be scanned 7 is calculated from this data, and the correcting lens 4 is moved according to the calculated moving amount.

As described above, according to the first to fifth preferred embodiments, in an optical scanning apparatus of the present invention, the controller 11 and the mechanisms 12, 13 which define adjusting mechanisms constituting an adjusting device to adjust the focal position of a light beam independently in at least one of the main and sub scanning directions. Therefore, the focal position of a light beam can independently be adjusted in the main scanning direction and the sub scanning direction without any mutual influence.

Moreover, according to the first to fifth preferred embodiments, because the detecting device 8 detects the vicinity of a light beam waist position independently in the main scanning direction and the sub scanning direction, detection accuracy of an image forming state of a light beam is greatly improved.

Furthermore, according to the first to fourth preferred embodiments, because the detecting device 8 is configured to have the openings 10, 14 to 16 in the main scanning direction, the light beam waist position can be detected with inexpensive elements such as a photodiode.

Additionally, according to the first to fourth preferred embodiments, because the openings 14 to 16 are inclined by using the light beam 9 incident upon the detecting device 8 as the rotation axis, the light beam waist position can be detected independently in the main and sub scanning directions with inexpensive elements such as a photodiode.

Moreover, according to the first to fifth preferred embodiments, the deflecting device for deflecting a light beam from the light source 1 preferably includes the polygonal mirror 5, and the deflecting device 5 uses a common deflecting surface of the deflecting device 5 within one cycle to detect the light beam image forming state. Therefore, the detection accuracy can be prevented from being deteriorated by light quantity dispersion on a detecting device attributed to reflectance dispersions of the surfaces of the polygonal mirror.

Now, other preferred embodiments of the present invention in which a focal position deviation of a scanning beam caused by environmental changes and other factors, is easily and securely corrected will be next described.

Figure 9:
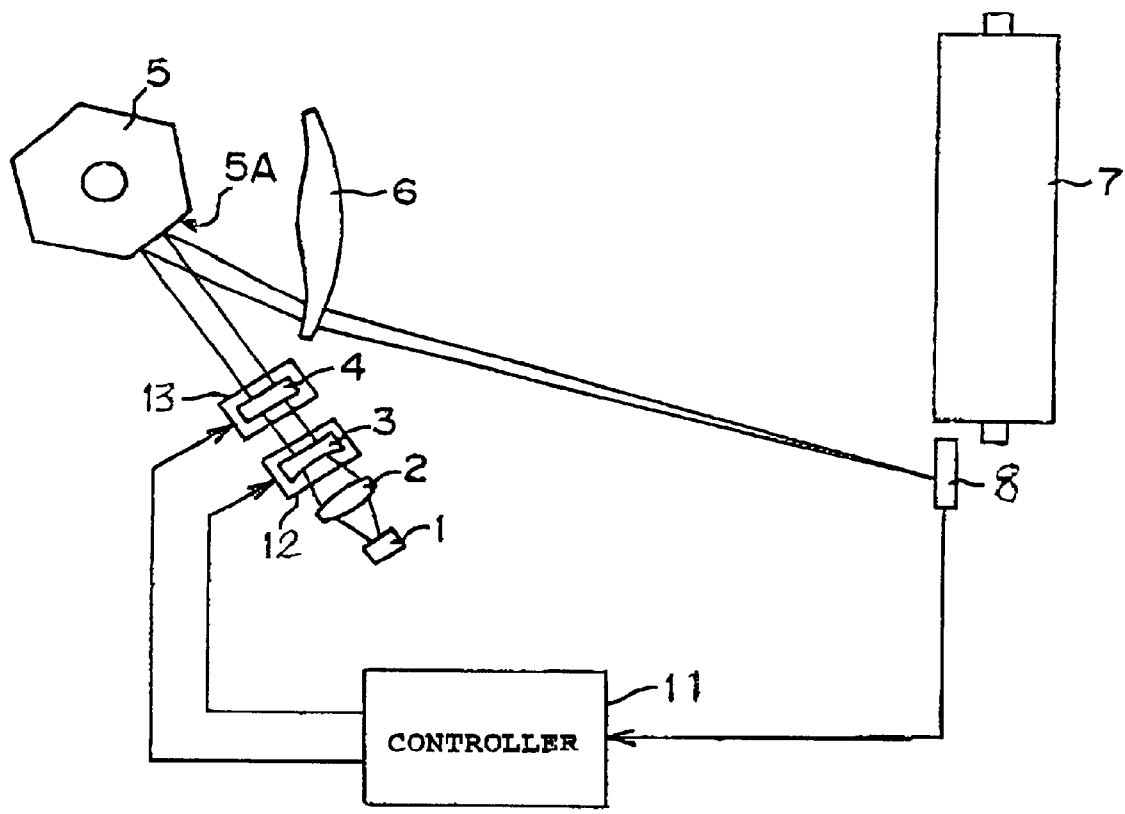
FIGS. 9(a) and 9(b) are explanatory views of another preferred embodiment of an optical scanning apparatus according to the present invention.
Figure 9:
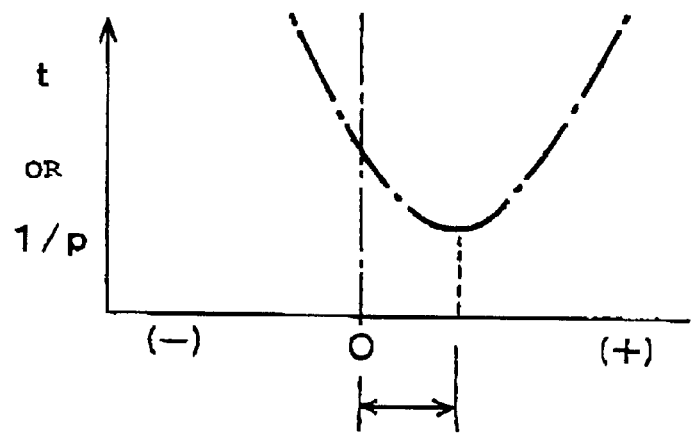

FIG. 9(a) is an explanatory view of an additional preferred embodiment of an optical scanning apparatus according to the present invention.

In FIG. 9(a), the optical scanning apparatus preferably includes a semiconductor laser 1 defining a light source, a coupling lens 2, lenses 3, 4 constituting an optical correcting system, a rotating polygonal mirror 5 defining an optical deflector, a scanning image forming optical system 6, a photoconductive member 7 defining a surface to be scanned, a beam spot detecting device 8, displacing mechanisms 12 and 13, and a controller 11.

The optical correcting system preferably includes at least one anamorphic surface which is different in power in a main scanning direction and in a sub scanning direction, such as a cylinder surface, a toroidal surface, and a special toroidal surface (a toroidal surface having a non-arc sectional shape in the main and sub scanning directions).

A divergent light flux radiated from the semiconductor laser 1 is converted to a light flux shape suitable for the subsequent optical system by the coupling lens 2. The converted light flux may be a parallel light flux, a converged light flux, or a divergent light flux. In this preferred embodiment, the light flux is converted to a converged light flux.

In the preferred embodiment of FIG. 9(a), the two lenses 3, 4 constituting the optical correcting system also function as the above-described optical system for correcting the surface tilt of the optical deflector 5. When the light flux from the coupling lens 2 is transmitted through the lenses 3, 4, a substantially linear image elongated in the main scanning direction is formed in the vicinity of a deflecting surface 5A of the rotating polygonal mirror 5. A scanning beam deflected at equiangular velocity by the rotating polygonal mirror 5 forms a beam spot on the surface of the photoconductive member 7 as a surface to be scanned by the action of the scanning image forming optical system 6, and thereby the photoconductive member 7 is optically scanned.

The beam spot detecting device 8 is disposed in a position substantially equivalent to that of the surface of the photoconductive member 7, and receives a scanning beam before or after the scanning beam scans the photoconductive member 7. The beam spot detecting device 8 preferably includes, for example, a two-dimensional CCD sensor, and the semiconductor laser 1 is lit only for a remarkably short time when the scanning beam passes through the middle portion of the light receiving surface of the CCD sensor of the beam spot detecting device 8. In this preferred embodiment, the two-dimensional light intensity distribution of the beam spot can be obtained by the output of the CCD sensor. A beam spot diameter "t" is obtained from this light intensity distribution. A peak value "P" of the light intensity distribution is inversely proportional to the beam spot diameter t. When the scanning beam generates a focal position deviation with respect to the surface to be scanned, the beam spot diameter t increases. When the focal position deviation is plotted as the abscissa and t or 1/p is plotted as the ordinate, t or 1/p forms a concave curve having an extreme minimum value in accordance with the focal position deviation, as illustrated in FIG. 9(b). When the above-described two-dimensional CCD sensor is used as the beam spot detecting device 8, beam spot diameters tm, ts of the main scanning direction and sub scanning direction can be detected.

When the focal position deviation is generated in the scanning beam over time due to temperature/humidity fluctuations and other environmental fluctuations, the amount of the focal position deviation of the scanning beam is obtained in accordance with the beam spot diameter detected by the beam spot detecting device 8. In order to correct the obtained focal position deviation amount, the displacing mechanisms 12, 13 are controlled by the controller 11 to displace the lens 3 and/or 4 of the optical correcting system in the optical axis direction, so that the beam spot diameter on the surface to be scanned (the main scanning direction diameter and/or the sub scanning direction diameter) can be adequately corrected. The controller 11 can preferably include a microcomputer or other suitable control device, and the above-described control can be performed by an appropriate program.

In FIG. 9(b), zero (0) on the abscissa indicates the position of the correcting lenses 3 and/or 4 in the initial state, and the initial-state minimum value of the above-described concave curve is in the zero position on the abscissa. When the focal position deviation is generated by the environmental fluctuations and the like, the concave curve deviates from the zero position of the abscissa, as illustrated in FIG. 9(b). Therefore, the focal position deviation on the surface to be scanned is corrected by displacing the correcting lens 3 and/or 4 in the optical axis direction.

Generally, because the environmental fluctuation is slowly generated, the focal position deviation does not have to be frequently corrected, and for example, it is sufficient only to perform the correction at intervals such as a sheet interval, after the given number of sheets, or at each batch operation (i.e., when a start button is depressed), without performing the correction when an image is formed by optical scanning.

Additionally, in preferred embodiments of the present invention, the focal position deviation caused by environmental fluctuations is corrected in a biasing manner by an optical system which is positioned on the light source side of a deflecting surface, and the correction of an image surface curvature is not performed. Therefore, it is preferable to effectively correct the image surface curvature (non-uniformity of a focus deviation within one scanning) of the scanning image forming optical system beforehand.

Figure 10:
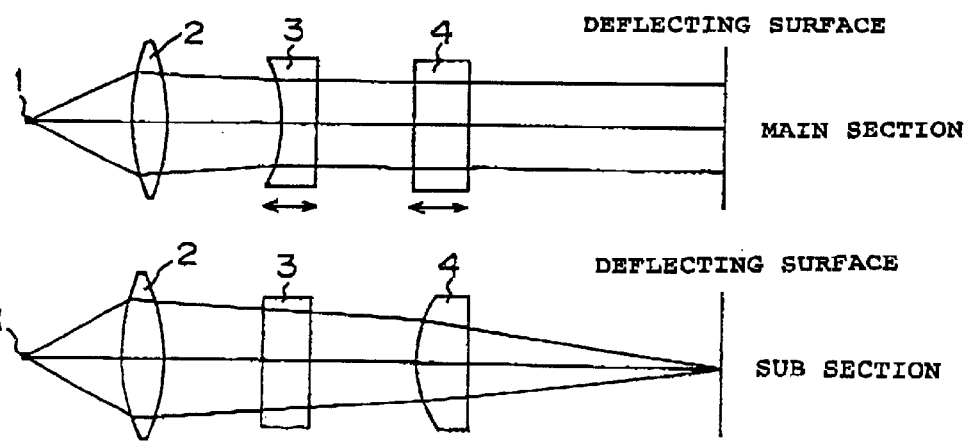
FIG. 10 is an explanatory view showing one example of a coupling lens and an optical correcting system of the optical scanning apparatus in the preferred embodiment shown in FIG. 9(a)

One example of the coupling lens 2 and the optical correcting system 3, 4 in the preferred embodiment illustrated in FIG. 9(a) will be described with reference to FIG. 10. In FIG. 10, a main section indicates a sectional state of the coupling lens 2 and the optical correcting lenses 3, 4 at a plane which includes the optical axis of the coupling lens 2 and which is substantially parallel to the main scanning direction. A sub section indicates a sectional state of the coupling lens 2 and the correcting lenses 3, 4 at a plane which includes the optical axis of the coupling lens 2 and which is substantially parallel to the sub scanning direction. This is likewise applied to the other drawings described later.

In the example illustrated in FIG. 10, a divergent light flux from the semiconductor laser 1 is converted to a converged light flux by the coupling lens 2, and is incident upon the optical correcting system. Among the lenses 3, 4 included in the optical correcting system, the lens 3 is a concave cylindrical lens having a negative power only in the main scanning direction, and converts the light flux from the coupling lens 2 into a substantially parallel light flux in the main section. Moreover, the lens 4 is preferably a convex cylindrical lens having a positive power only in the sub scanning direction, and forms the light flux from the coupling lens 2 into a substantially linear image elongated along the main scanning direction in the vicinity of a deflecting surface of the deflector 5. Specifically, the optical correcting system also functions as the optical system for correcting the surface tilt of the deflector 5.

In this example, for example, when the focal position of a scanning beam in the main scanning direction is deviated toward the light source 1 from the surface to be scanned, by displacing the lens 3 toward the right in the optical axis direction in FIG. 10, the focal position of the main scanning direction can be moved toward the surface to be scanned. Therefore, by adjusting the displacement of the lens 3 (by controlling the displacing mechanism 11 by the controller 11) in accordance with the amount of the focal position deviation of the main scanning direction detected by the beam spot detecting device 8, the focal position deviation of the main scanning direction can be corrected.

Likewise, when the focal position of the sub scanning direction of the scanning beam is deviated, by displacing the lens 4 toward the right or left in the optical axis direction in FIG. 10, the focal position of the sub scanning direction can be moved toward the surface to be scanned or toward the light source 1. Therefore, by adjusting the displacement of the lens 4 (by controlling the displacing mechanism 13 by the controller 11) in accordance with the amount of the focal position deviation of the sub scanning direction detected by the beam spot detecting device 8, the focal position deviation of the sub scanning direction can be corrected.

As described above, in the example illustrated in FIG. 10, the focal position deviations of the main and sub scanning directions can independently be corrected and adjusted.

The optical scanning apparatus of the above-described preferred embodiment illustrated in FIGS. 9(a) and 10 is provided with the light source 1, the coupling lens 2 for converting the light flux radiated from the light source 1 to the converged light flux, the optical scanning systems 5, 6 for deflecting the light flux converted by the coupling lens 2 and condensing the deflected scanning beam onto the surface to be scanned 7, and a correcting/adjusting device for correcting/adjusting the focal position deviation of the scanning beam on the surface to be scanned caused by environmental fluctuations. The correcting/adjusting device includes the optical correcting systems 3, 4 disposed between the coupling lens 2 and a deflecting surface of the deflector 5 in the optical scanning system, and the optical correcting system 3, 4 preferably includes at least one anamorphic surface different in power in the main and sub scanning directions.

Moreover, the correcting/adjusting device includes the optical correcting systems 3, 4, the beam spot detecting device 8, the displacing mechanisms 12, 13 for displacing one or more optical elements of the optical correcting system 3, 4 in the optical axis direction, and the control device 11 for controlling the displacing mechanisms 12, 13.

Furthermore, the correcting/adjusting device adjusts the focal position with respect to the main scanning direction and the sub scanning direction independent of each other.

Further, the coupling lens 2 converts the light flux from the light source 1 to the converged light flux, the optical correcting system has the concave cylindrical lens 3 having the negative power in the main scanning direction, and the convex cylindrical lens 4 having the positive power in the sub scanning direction, and the displacing mechanisms 12, 13 independently displace the concave cylindrical lens 3 and the convex cylindrical lens 4 in the optical axis direction.

Figure 11:
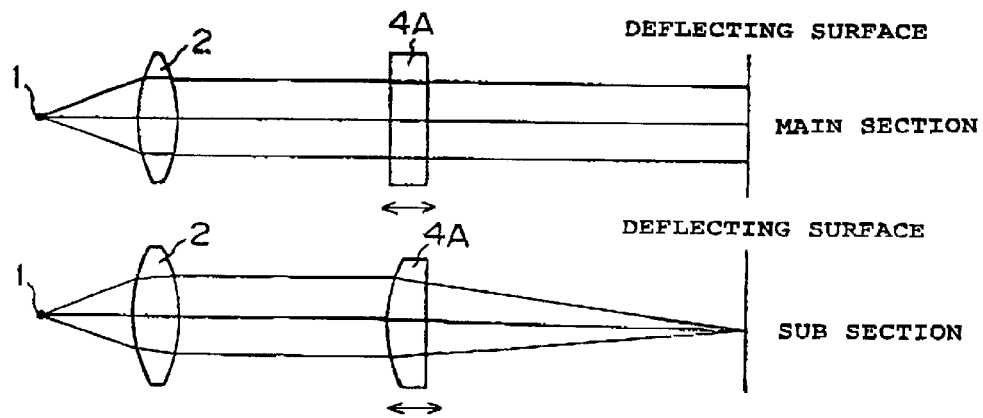
FIG. 11 is an explanatory view showing another example of a coupling lens and an optical correcting system of another preferred embodiment of the optical scanning apparatus.

FIG. 11 illustrates another example of the coupling lens 2 and the optical correcting system 3, 4 in the preferred embodiment illustrated in FIG. 9(a), in which the optical correcting system preferably includes one convex cylindrical lens 4A. As illustrated in FIG. 11, the convex cylindrical lens 4A has a positive power only in the sub scanning direction. A divergent light flux from the semiconductor laser 1 defining the light source is converted to a parallel light flux by the coupling lens 2, incident upon the convex cylindrical lens 4A as the optical correcting system, and converged only in the sub scanning direction, so that a linear image elongated along the main scanning direction is formed. Therefore, also in this example, the convex cylindrical lens 4A also functions as the optical system for correcting the surface tilt of the deflector 5.

In this example, the focal position of a scanning beam is adjusted by displacing the convex cylindrical lens 4A in the optical axis direction by the displacing mechanism in accordance with the amount of a focal position deviation of the sub scanning direction detected by the beam spot detecting device 8, and thereby the beam spot diameter of the sub scanning direction on the surface to be scanned can be optimized.

In the example illustrated in FIG. 11, as described above, the beam spot diameter of the sub scanning direction is adjusted, but, the beam spot diameter of the main scanning direction is not adjusted. However, when fluctuation of the beam spot diameter of the main scanning direction is large over time, the beam spot diameter of the main scanning direction can be optimized by using a concave cylindrical lens having the negative power in the main scanning direction defining the optical correcting system and displacing the optical correcting system in the optical axis direction As described above, in the optical scanning apparatus having the characteristic elements of the example described above with reference to FIG. 11, the correcting/adjusting device adjusts the focal position in one of the main scanning direction and the sub scanning direction, the optical correcting system includes the convex cylindrical lens 4A having the positive power in the sub scanning direction, and the displacing mechanism displaces the cylindrical lens 4A in the optical axis direction.

Figure 12:
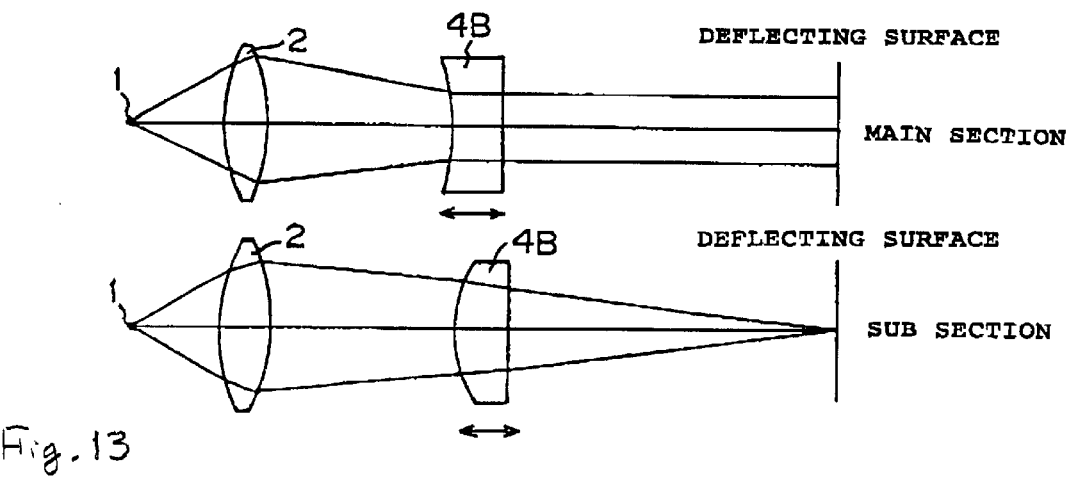
FIG. 12 is an explanatory view showing another example of a coupling lens and an optical correcting system of another preferred embodiment of the optical scanning apparatus.

FIG. 12 illustrates another example of the coupling lens 2 and the optical correcting system 3, 4 in the preferred embodiment illustrated in FIG. 9(a), in which the optical correcting system preferably includes one toroidal lens 4B. As illustrated in FIG. 12, the toroidal lens 4B has the negative power in the main scanning direction, and the positive power in the sub scanning direction. The coupling lens 2 converts a divergent light flux from the semiconductor laser I to a convergent light flux. The converted light flux is converted to a substantially parallel light flux in the main scanning direction and to a convergent light flux in the sub scanning direction by a toroidal surface of the toroidal lens 4B. The light flux passed through the toroidal lens 4B is formed into a substantially linear image which is elongated along the main scanning direction in the vicinity of a deflecting surface of the deflector 5. Therefore, the toroidal lens 4B constituting the optical correcting system also functions as the optical system for correcting the surface tilt of the deflector 5.

The toroidal lens 4B is displaced and adjusted in the optical axis direction by the displacing mechanism based on a focal position deviation of the main scanning direction and/or the sub scanning direction detected by the beam spot detecting device 8, such that an excellent quality beam spot can be formed on a surface to be scanned. The amount of focal position deviation due to environmental fluctuations generally differs in the main scanning direction and in the sub scanning direction. Therefore, the curvature radii of the main scanning direction and sub scanning direction are set beforehand so that the correction amounts of the focal position of the main and sub scanning directions become appropriate with respect to the displacement distance of the toroidal lens 4B.

As described above, in the optical scanning apparatus with the characteristic elements of the example illustrated in FIG. 12, the correcting/adjusting device simultaneously adjusts the focal positions in the main scanning direction and the sub scanning direction, the optical correcting system includes the toroidal lens 4B having a concave toroidal surface in the main scanning direction and a convex toroidal surface in the sub scanning direction, and the displacing mechanism displaces the toroidal lens 4B in the optical axis direction.

Figure 13:
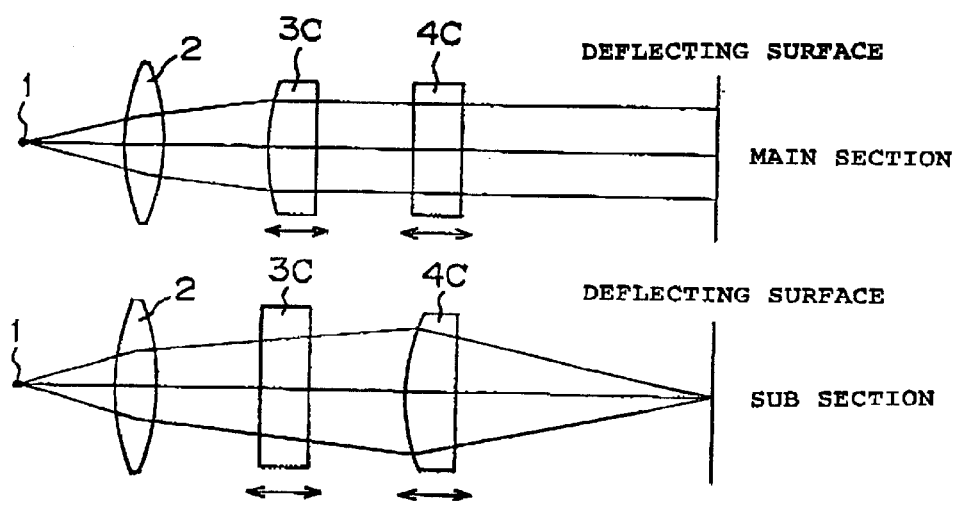
FIG. 13 is an explanatory view showing still another example of a coupling lens and an optical correcting system of another preferred embodiment of the optical scanning apparatus.

Moreover, as illustrated in FIG. 13, the coupling lens 2 may be configured to convert a light flux from the light source 1 to a divergent light flux, the optical correcting system may include a convex cylindrical lens 3C having the positive power in the main scanning direction and a convex cylindrical lens 4C having the positive power in the sub scanning direction, and the displacing mechanism can be configured to displace each of the convex cylindrical lenses 3C, 4C in the optical axis direction independent of each other. In this case, the divergent light flux from the coupling lens 2 is converted to a substantially parallel light flux in the main section by the convex cylindrical lens 3C, and a substantially linear image elongated along the main scanning direction is formed in the vicinity of a deflecting surface of the deflector 5 by the convex cylindrical lens 4C.

Four specific examples of an optical scanning apparatus according to preferred embodiments of the present invention will be described hereinafter.

Figure 14:
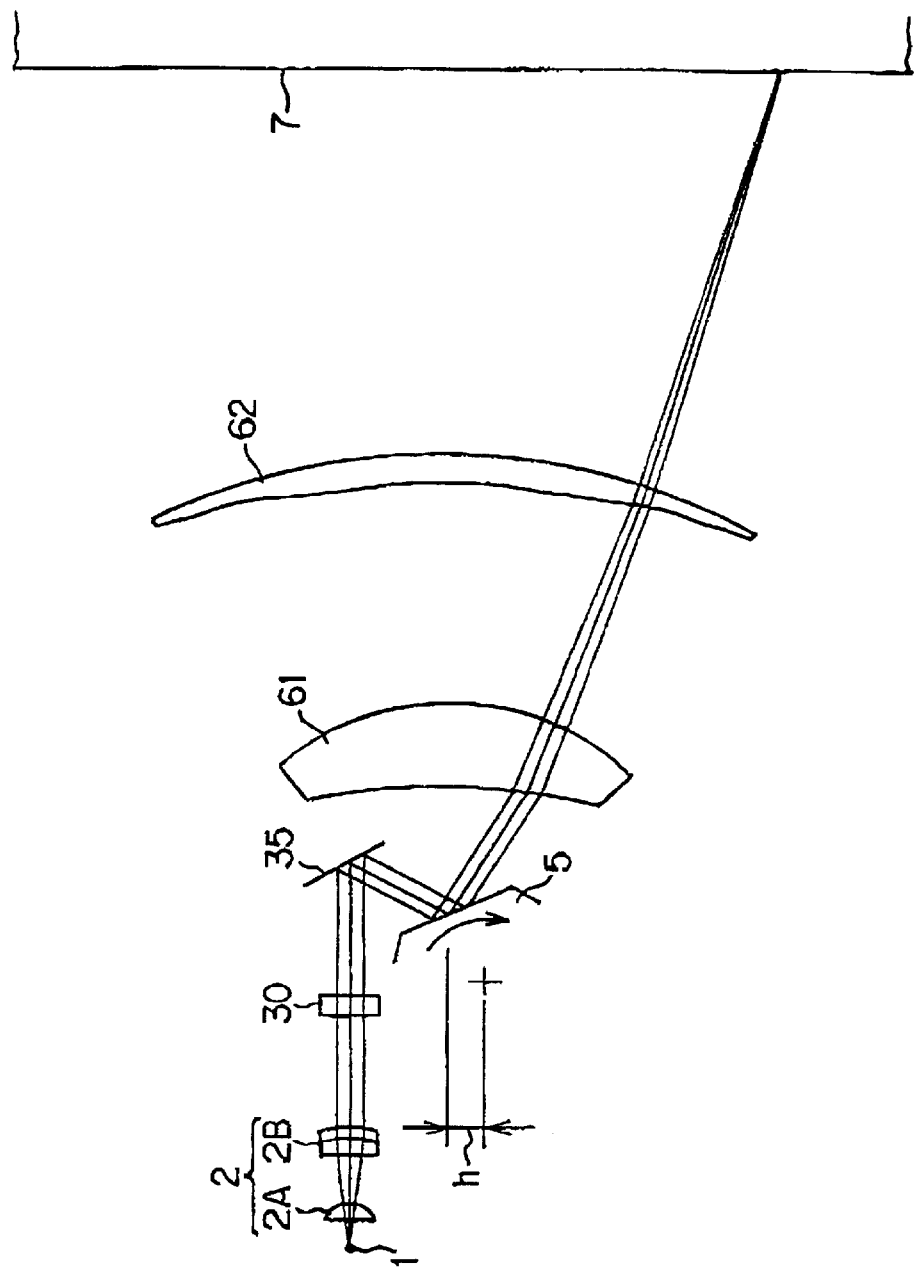
FIG. 14 is an explanatory view of a typical arrangement of an optical system of the optical scanning apparatus.

A typical optical arrangement of the examples is illustrated in FIG. 14.

The coupling lens 2 preferably includes three pieces of lenses in two groups, a first group on the side of the light source and a second group on the side of the optical deflector 5. The first group preferably includes a single lens of a lens 2A, and the second group preferably includes a lens 2B, which is defined by two pieces of lenses connected together. The rotating polygonal mirror 5 defining the deflector preferably has six deflecting surfaces, and an inscribed circle radius of the deflector 5 is preferably about 25 mm. The scanning image forming optical system has a two-lens constitution including scanning lenses 61, 62.

A light flux emerged from the coupling lens 2 and transmitted through a correcting lens 30 is reflected by a mirror 35 and incident upon a deflecting surface of the rotating polygonal mirror 5. The angle formed by the main beam of an incident light flux onto a deflecting surface of the rotating polygonal mirror 5 with respect to the above-described optical axis when the main beam direction of a scanning beam reflected by the deflecting surface of the polygonal mirror 5 is parallel to the optical axis of the scanning lenses 61, 62 is called the incident angle to the rotating polygonal mirror 5, then the incident angle is 60 degree. The distance between the optical axis of the scanning image forming optical system and the rotation axis of the rotating polygonal mirror 5 (distance "h" in FIG. 14) is about 10.7 mm. The field angle of the scanning image forming optical system is in a range of about −39.12 to about +39.12 degree, and a scanning area is about ±150 mm. The above-described constitution is common to first to fourth examples.

In each of the examples, the optical system includes a special toroidal surface. The analytic representation of the special toroidal surface can be various, but in this specification, the following equation is used.

$$X = (Y^2/Rm)/\left[1 + \sqrt{1 + (1+Km)(Y/Rm)^2}\right] +$$
$$a01 \cdot Y + a02 \cdot Y^2 + a03 \cdot Y^3 + a04 \cdot Y^4 + a05 \cdot Y^5 + \ldots +$$
$$(Z^2 \cdot Cs)/[1 + \cdot\{1 - (1 + Ks)(Z \cdot Cs)^2\} +$$
$$(f00 + f01 \cdot Y + f02 \cdot Y^2 + f03 \cdot Y^3 + f04 \cdot Y^4 + \ldots) \cdot Z +$$
$$(g00 + g01 \cdot Y + g02 \cdot Y^2 + g03 \cdot Y^3 + g04 \cdot Y^4 + \ldots) \cdot Z^2 +$$
$$(h00 + h01 \cdot Y + h02 \cdot Y^2 + h03 \cdot Y^3 + h04 \cdot Y^4 + \ldots) \cdot Z^3 +$$
$$(i00 + i01 \cdot Y + i02 \cdot Y^2 + i03 \cdot Y^3 + i04 \cdot Y^4 + \ldots) \cdot Z^4 +$$
$$(j00 + j01 \cdot Y + j02 \cdot Y^2 + j03 \cdot Y^3 + j04 \cdot Y^4 + \ldots) \cdot Z^5 + \ldots$$

wherein, $$Cs = 1/Rs0 + b01 \cdot Y + b02 \cdot Y^2 + b03 \cdot Y^3 + b04 \cdot Y^4 + b05 \cdot Y^5 + \ldots$$

$$Ks = Ks0 + c01 \cdot Y + c02 \cdot Y^2 + c03 \cdot Y^3 + c04 \cdot Y^4 + c05 \cdot Y^5 + \ldots$$

In this equation, "Y" represents a surface position measured in the main scanning direction from the optical axis of the special toroidal surface, "Z" represents a surface position measured in the sub scanning direction from the optical axis of the special toroidal surface, and "X" represents a depth of the special toroidal surface in the optical axis direction in the surface position (Y, Z). Symbol "Rm" represents a paraxial curvature radius in the main section, and "Rs0" represents a paraxial curvature radius in the sub section. The special toroidal surface is specified by giving constants other than X, Y, Z in the above equation. In the above representation, for example, "$Y^3$" represents the cube of "Y".

First, the optical arrangement of a scanning image forming optical system subsequent to the rotating polygonal mirror 5, which is common to the first to fourth examples, will be provided.

Each of the scanning lenses 61, 62 of the scanning image forming optical system preferably has special toroidal surfaces represented by the above equation on both surfaces.

In the following data of the scanning image forming optical system, surface number 10 represents the deflecting surface of the rotating polygonal mirror 5, surface number 11 represents the lens surface of the scanning lens 61 on the incident side, surface number 12 represents the lens surface of the scanning lens 61 on the emitting side, surface number 13 represents the lens surface of the scanning lens 62 on the incident side, and surface number 13 represents the lens surface of the scanning lens 62 on the emitting side. Further, the surface interval on the optical axis in the optical path leading to a surface to be scanned from the deflecting surface of the deflector 5 is represented by "x", and refractive index is represented by "n". The unit of the amount having a length dimension is "mm".

Data of Scanning Image Forming Optical System:

| Surface No. | Rm | Rs0 | x | n | Surface Shape |
|---|---|---|---|---|---|
| 10 | ∞ | — | 47.976 | 1 | Flat |
| 11 | −242.186 | −242.337 | 31.572 | 1.52716 | Special toroidal |
| 12 | −83.064 | 138.908 | 81.808 | 1 | Special toroidal |
| 13 | −239.054 | −78.986 | 9.854 | 1.52716 | Special toroidal |
| 14 | −218.790 | −26.516 | 145.000 | 1 | Special toroidal |

Coefficients of Surface Number 11:

K=6.93347E-01, a01=0.0, a02=0.0, a03=0.0, a04=−3.70017E-09, a05=0.0, a06=5.39622E-12, a07=0.0, a08=−2.68766E-14, a09=0.0, a10=3.28917E-18, b01=0.0, b02=−1.08500E-05, b03=0.0, b04=4.46227E-09, b05=0.0, b06=−1.49800E-12, b07=0.0, b08=−1.19546E-15, b09=0.0, b10=1.43182E-18, b11=0.0, b12=−3.52249E-22, b13=0.0, b14=−2.80724E-25, b15=0.0, b16=1.30393E-28

Coefficients of Surface Number 12:

K=−2.37022E-01, a01=0.0, a02=0.0, a03=0.0, a04=5.27513E-08, a05=0.0, a06=−2.06725E-13, a07=0.0, a08=6.19164E-16, a09=0.0, a10=−2.12715E-18, a11=0.0, a12=0.0, b01=1.12848E-05, b02=0.0, b03=8.24141E-09, b04=0.0, b05=−8.37007E-12, b06=0.0, b07=1.60925E-15, b08=0.0, b09=1.03355E-19, b10=0.0

Coefficients of Surface Number 13:

K=−9.08134+E00, a01=0.0, a02=0.0, a03=0.0, a04=−1.36973E-10, a05=0.0, a06=−1.03614E-12, a7=0.0, a08=−1.50199E-16, a09=0.0, a10=−1.26692E-21, a11=0.0, a12=−4.03007E-25, a13=0.0, a14=5.73396E-30, a15=0.0, a16=1.68846E-33, b01=1.54737E-06, b02=0.0, b03=2.80104E-10, b04=0.0, b05=−1.24917E-13, b06=0.0, b07=2.52195E-17, b08=0.0, b09=−3.61122E-21, b10=0.0, b11=2.91349E-25, b12=0.0, b13=−1.64519E-29, b14=0.0, b15=1.78570E-33, b16=0.0, b17=−1.07473E-37

Coefficients of Surface Number 14:
a00=−7.44526E+00, a01=0.0, a02=0.0, a03=0.0,
a04=−7.05574E-08, a05=0.0, a06=1.94608E-13, a07=0.0,
a08=−1.36055E-16, a09=0.0, a10=−5.23122E-21, a11=0.0,
a12=−1.53498E-25, a13=0.0, a14=−2.05165E-29, a15=0.0,
a16=−2.41955E-34,
b01=0.0, b02=−1.16190E-08, b03=0.0, b04=−2.26696E-11,
b05=0.0, b06=−1.57396E-15, b07=0.0, b08=4.57890E-20,
b09=0.0, b10=−3.84376E-24, b11=0.0, b12=−7.46478E-28,
b13=0.0, b14=−5.87572E-32, b15=0.0, b16=1.10235E-36,
b17=0.0, b18=1.59801E40,
c00=−3.14917E-01,
i00=3.16572E-06, i01=−1.36982E-09, i02=1.20856E-10,
i03=4.13789E-12, i04=3.06818E-13, i05=−7.26971E-15,
i06=−1.19343E-16, i07=4.38963E-18, i08=1.31447E-20,
i09=−1.20277E-21, i10=−2.13776E-24, i11=1.71321E-25,
i12=7.87140E-28, i13=−1.31268E-29, i14=−1.24114E-31,
i15=5.10054E-34, i16=8.22184E-36, i17=−7.80479E-39,
i18=−1.96998E40,
k00=3.36579E-08, k01=5.70681E-11, k02=−1.18665E-11,
k03=−1.65174E-13, k04=−6.31836E-15, k05=3.09419E-16,
k06=−1.45500E-18, k07=−1.96601E-19, k08=3.00451E-21,
k09=5.69360E-23, k10=−9.50625E-25, k11=−8.67173E-27,
k12=1.36241E-28, k13=7.22104E-31, k14=−1.01551E-32,
k15=−3.11569E-35, k16=3.82264E-37, k17=5.45418E-40,
k18=−5.72169E-42

In the above data, for example, "E-31" means "$10^{-31}$", and this numeric value depends on the immediately preceding value.

FIRST EXAMPLE

A first example is a specific example of the preferred embodiment described above with reference to FIG. 11. The coupling lens 2 converts a divergent light flux from the semiconductor laser 1 into a parallel light flux. The surface of the light source 1 is represented by surface number 0, and the lens surface of lenses 2A, 2B of the coupling lens 2 are represented by surface numbers 1, 2, 3, 4, 5 in order from the side of the light source 1. Surface number 4 represents a bonded surface of the lens 2B.

The optical correcting system 30 includes a convex cylindrical lens having the power only in the sub scanning direction, and the surface of the lens 30 on the incident side is represented by surface number 6, and the surface of the lens 30 on the emitting side is represented by surface number 7.

In the following data, the paraxial curvature radii in the main section and sub section are represented by "Rm" and "Rs", respectively, a distance between surfaces is represented by "x", and the refractive index is represented by "n".

Data of Optical System between Light Source and Deflecting Surface in First Example:

| Surface No. | Rm | Rs | x | n | Surface Shape |
|---|---|---|---|---|---|
| 0 | — | — | 9.893 | 1 | Flat |
| 1 | −23.171 | — | 2.600 | 1.6421185 | Spherical |
| 2 | −8.950 | — | 20.000 | 1 | Spherical |
| 3 | 202.153 | — | 2.000 | 1.8274625 | Spherical |
| 4 | 20.821 | — | 5.000 | 1.7208530 | Spherical |
| 5 | −35.406 | — | 173.473 | 1 | Spherical |
| 6 | ∞ | 54.9 | 3.000 | 1.5143315 | Sub cylinder |
| 7 | ∞ | — | 104.640 | 1 | Flat |

When the optical arrangement on the side of the light source 1 from the rotating polygonal mirror 5 is determined as in the above first example, and while there is no focal position deviation of a scanning beam, the image surface curvature and the constant velocity characteristic (fθ characteristics, linearity) of the scanning image forming optical system constituted by the scanning lenses 61, 62 are as illustrated in FIG. 15.

The above data indicates the data when there is no focal position deviation of the scanning beam. When the focal position deviation in the sub scanning direction is detected, the convex cylindrical lens 30 as the optical correcting system is displaced in the optical axis direction (the above-described surface interval of 5=173.473 is changed), so that the focal position in the sub scanning direction is adjusted and thereby the beam spot diameter in the sub scanning direction is adequately set.

SECOND EXAMPLE

In the second example, the coupling lens 2 is the same as that of the first example, but the optical correcting system 30 is a combination of a concave cylindrical lens having the negative power in the main section (disposed on the side of the coupling lens) and a convex cylindrical lens having the positive power in the sub section (disposed on the side of the rotating polygonal mirror 5), and a light flux from the light source 1 is converted to a weak-convergent light flux by the coupling lens 2. Therefore, the coupling lens 2 is positioned slightly toward the rotating polygonal mirror 5 from its position in the first example.

The surfaces of the two cylindrical lenses constituting the correcting lens 30 are represented by surface numbers 6, 7, 8, 9 in order from the side of the coupling lens 2.

Data of Optical System between Light Source and Deflecting Surface in Second Example:

| Surface No. | Rm | Rs | x | N | Surface Shape |
|---|---|---|---|---|---|
| 0 | — | — | 10.784 | 1 | Flat |
| 1 | −23.171 | — | 2.600 | 1.6421185 | Spherical |
| 2 | −8.950 | — | 20.000 | 1 | Spherical |
| 3 | 202.153 | — | 2.000 | 1.8274625 | Spherical |
| 4 | 20.821 | — | 5.000 | 1.7208530 | Spherical |
| 5 | −35.406 | — | 150.473 | 1 | Spherical |
| 6 | −200.000 | ∞ | 3.000 | 1.5143315 | Main cylinder |
| 7 | ∞ | — | 20.000 | 1 | Flat |

-continued

| Surface No. | Rm | Rs | x | N | Surface Shape |
|---|---|---|---|---|---|
| 8 | ∞ | 77.4 | 3.000 | 1.5143315 | Sub cylinder |
| 9 | ∞ | — | 104.640 | 1 | Flat |

The above data indicates the data when there is no focal position deviation of a scanning beam. When the focal position deviation in the main scanning direction is detected, the concave cylindrical lens in the optical correcting system 30 is displaced in the optical axis direction (the above-described surface interval of 5=150.473 is changed), and thereby the focal position in the main scanning direction is adjusted. When the focal position deviation in the sub scanning direction is detected, the convex cylindrical lens in the optical correcting system 30 is displaced in the optical axis direction, and thereby the focal position in the sub scanning direction is adjusted and the beam spot diameter of the sub scanning direction is adequately set.

THIRD EXAMPLE

In the third example, the coupling lens 2 is the same as that of the first example, but the optical correcting system 30 includes a toroidal lens which has a toroidal surface having the positive power in the sub scanning direction, and a light flux from the light source 1 is converted to a weak-convergent light flux by the coupling lens 2. Therefore, the coupling lens 2 is positioned slightly toward the rotating polygonal mirror 5 from its position in the first example. The position of the coupling lens 2 is the same as that in the second example.

The surfaces of the toroidal lenses constituting the correcting lens 30 are represented by surface numbers 6, 7 in order from the side of the coupling lens 2.

Data of Optical System between Light Source and Deflecting Surface in Third Example:

| Surface No. | Rm | Rs | x | N | Surface Shape |
|---|---|---|---|---|---|
| 0 | — | — | 10.784 | 1 | Flat |
| 1 | −23.171 | — | 2.600 | 1.6421185 | Spherical |
| 2 | −8.950 | — | 20.000 | 1 | Spherical |
| 3 | 202.153 | — | 2.000 | 1.8274625 | Spherical |
| 4 | 20.821 | — | 5.000 | 1.7208530 | Spherical |
| 5 | −35.406 | — | 173.473 | 1 | Spherical |
| 6 | −200.000 | 77.5 | 3.000 | 1.5143315 | Toroidal |
| 7 | ∞ | — | 104.640 | 1 | Flat |

The above data indicates the data when there is no focal position deviation of a scanning beam. When the focal position deviations in the main and sub scanning directions are detected, the toroidal lens as the optical correcting system 30 is displaced in the optical axis direction (the surface interval of 5=173.473 is changed), and thereby the focal positions in the main and sub scanning directions are adjusted and the beam spot diameter is adequately set.

FOURTH EXAMPLE

In the fourth example, a special toroidal surface is used as the toroidal surface of the surface number 6 in the third example. The other elements are the same as those in the third example.

Data of Special Toroidal Surface of Surface Number 6:

$K=9.68391E+01$, $a01=0.0$, $a02=0.0$, $a03=0.0$, $a04=-1.37800E-06$, $a05=0.0$, $a06=-2.92920E-07$, $a07=0.0$, $a08=4.98901E-09$, $a09=0.0$, $a10=8.33987E-10$, $b01=0.0$, $b02=-1.71344E-05$, $b03=0.0$, $b04=-8.78926E-07$, $b05=0.0$, $b06=-4.33746E-09$, $b07=0.0$, $b08=3.69140E-09$, $b09=0.0$, $b10=4.55399E-11$, $i00=-2.24001E-06$, $i01=0.0$, $i02=4.58160E-08$, $i03=0.0$, $i04=-1.83028E-08$, $k00=-1.87695E-06$, $k01=0.0$, $k02=-1.94267E-08$, $k03=0.0$, $k04=-8.38126E-09$

FIG. 16(a) illustrates the wave-front aberration in the third example. FIG. 16(b) illustrates the wave-front aberration in the fourth example. As seen from the comparison of FIGS. 16(a), 16(b), by using the special toroidal surface like in the fourth example, the wave-front aberration is effectively corrected, and a scanning beam can be converged to a smaller-diameter beam spot.

Additionally, in the first to fourth examples, the semiconductor laser as the light source 1 includes a cover glass which preferably has a thickness of about 0.3 mm and refractive index of about 1.514.

As described above, in an optical scanning apparatus of various preferred embodiments of the present invention, an increase of the beam spot diameter over time due to a focal position deviation of a scanning beam caused by environmental fluctuations and other factors is effectively corrected and the beam spot diameter is precisely set to a desired size, and thereby excellent quality optical-scanning is achieved.

Numerous additional modifications and variations of the present invention are possible in light of the above teachings. It is therefore to be understood that within the scope of the appended claims, the present invention may be practiced in ways other than as specifically described herein.

This document claims priority and contains subject matter relating to Japanese Patent Applications No. 11-077996 filed on Mar. 23, 1999 and No. 11-140230 filed on May 20, 1999, respectively, in the Japanese Patent Office, the entire contents of which are hereby incorporated by reference.

What is claimed is:

1. An optical scanning apparatus comprising:

a light source arranged to radiate a light beam;

an optical scanning system arranged to deflect the light beam from the light source and to condense the light beam on a surface to be scanned;

a detecting device arranged to detect an image forming state of the light beam scanned by the optical scanning system in each of a main scanning direction and a sub scanning direction independently, the detecting device including only a single pixel; and an adjusting mechanism arranged to adjust the focal position of the light beam on the surface to be scanned.

2. The optical scanning apparatus according to claim 1, wherein the detecting device is arranged to detect the image forming state in the main scanning direction and the sub scanning direction simultaneously.

3. The optical scanning apparatus according to claim 1, wherein the detecting device is arranged to detect the image forming state using a continuous pulse of the light beam.

4. The optical scanning apparatus according to claim 1, wherein the detecting device monitors the image forming state of the light beam and detects the vicinity of a light beam waist position relative to a desired waist position on the surface to be scanned.

5. The optical scanning apparatus according to claim 1, further comprising a first slit arranged to detect the image forming state in the main scanning direction and a second slit arranged to detect the image forming state in the sub scanning direction.

6. The optical scanning apparatus according to claim 5, wherein the second slit is arranged at an angle relative to the first slit.

7. The optical scanning apparatus according to claim 6, wherein the second slit is arranged such that opposite ends of the second slit are located outside of a pair of parallel lines defining a beam spot diameter therebetween.

8. The optical scanning apparatus according to claim 5, wherein the first slit and the second slit are part of an integral, unitary body having a substantially triangular shape.

9. The optical scanning apparatus according to claim 1, further comprising a slit arranged to detect the image forming state in the main scanning direction and a line CCD arranged to detect the image forming state in the sub scanning direction.

10. The optical scanning apparatus according to claim 1, wherein the adjusting mechanism for adjusting the focal position of the light beam on the surface to be scanned adjusts at least one of two lens elements.

11. The optical scanning apparatus according to claim 1, wherein the adjusting mechanism for adjusting the focal position of the light beam on the surface to be scanned adjusts a lens element having power in the main scanning direction only so as to adjust the beam spot diameter in the main scanning direction.

12. The optical scanning apparatus according to claim 1, wherein the adjusting mechanism for adjusting the focal position of the light beam on the surface to be scanned adjusts a lens element having power in the sub scanning direction only so as to adjust the beam spot diameter in the sub scanning direction.

13. The optical scanning apparatus according to claim 1, wherein the adjusting mechanism for adjusting the focal position of the light beam on the surface to be scanned adjusts at least one of two lens elements after the detecting device has detected at least three successive scans of beam spots on the surface to be scanned.

14. The optical scanning apparatus according to claim 13, further comprising a deflecting device having a plurality of deflecting surfaces and wherein a common one of the plurality of deflecting surfaces of the deflecting device is used for each of the successive scans of beam spots.

15. The optical scanning apparatus according to claim 1, wherein the detecting device includes a first slit arranged to detect an image forming state in the main scanning direction and a second slit arranged to detect an image forming state in the sub scanning direction, and the adjusting mechanism for adjusting the focal position of the light beam on the surface to be scanned first adjusts a first lens element having power in the sub scanning direction only so as to adjust the beam spot diameter in the sub scanning direction and subsequently adjusts a second lens elements having power in the main scanning direction only so as to adjust the beam spot diameter in the main scanning direction.

16. The optical scanning apparatus according to claim 1, wherein the detecting device includes a single slit arranged to detect an image forming state in the main scanning direction and in the sub scanning direction, and the adjusting mechanism for adjusting the focal position of the light beam on the surface to be scanned first adjusts a first lens element having power in the sub scanning direction only so as to adjust the beam spot diameter in the sub scanning direction and subsequently adjusts a second lens elements having power in the main scanning direction only so as to adjust the beam spot diameter in the main scanning direction.

17. The optical scanning apparatus according to claim 1, wherein the detecting device includes a first slit arranged to detect an image forming state in the main scanning direction and a second slit arranged to detect an image forming state in the sub scanning direction, and the adjusting mechanism for adjusting the focal position of the light beam on the surface to be scanned first adjusts a first lens element having power in the main scanning direction only so as to adjust the beam spot diameter in the main scanning direction and subsequently adjusts a second lens element having power in the sub scanning direction only so as to adjust the beam spot diameter in the sub scanning direction.

18. The optical scanning apparatus according to claim 1, wherein the detecting device includes a single slit arranged to detect an image forming state in the main scanning direction and in the sub scanning direction, and the adjusting mechanism for adjusting the focal position of the light beam on the surface to be scanned first adjusts a first lens element having power in the main scanning direction only so as to adjust the beam spot diameter in the main scanning direction and subsequently adjusts a second lens element having power in the sub scanning direction only so as to adjust the beam spot diameter in the sub scanning direction.

19. The optical scanning apparatus according to claim 1, wherein the detecting device is arranged to detect synchronizing conditions and output synchronizing signals used to adjust an image forming start position when the detecting device is not detecting an image forming state of the beam spots.

20. An image forming apparatus including:
 a light source arranged to radiate a light beam;
 an optical scanning system arranged to deflect the light beam from the light source and to condense the light beam on a surface to be scanned;
 a detecting device arranged to detect an image forming state of the light beam scanned by the optical scanning system in each of a main scanning direction and a sub scanning direction independently, the detecting device including only a single pixel; and
 an adjusting mechanism arranged to adjust the focal position of the light beam on the surface to be scanned.

21. A method of forming an image comprising the steps of:
 radiating a light beam;
 deflecting the light beam so as to condense the light beam on a surface to be scanned;
 detecting an image forming state of the light beam in both a main scanning direction and a sub scanning direction independently, using only a single pixel; and
 adjusting the focal position of the light beam on the surface to be scanned based on the result of the step of detecting the image forming state of the light beam.

22. The method according to claim 21, wherein the step of detecting an image forming state includes detecting the image forming state in the main scanning direction and the sub scanning direction simultaneously.

23. The method according to claim 21, wherein the step of detecting an image forming state includes detecting the image forming state using a continuous pulse of the light beam.

24. The method according to claim 21, wherein the step of detecting an image forming state includes monitoring the image forming state of the light beam and detecting the vicinity of a light beam waist position relative to a desired waist position on the surface to be scanned.

25. The method according to claim 21, wherein the step of adjusting the focal position of the light beam on the surface to be scanned includes adjusting at least one of two lens elements.

26. The method according to claim 21, wherein the step of adjusting the focal position of the light beam on the surface to be scanned includes adjusting a lens element having power in the main scanning direction only so as to adjust the beam spot diameter in the main scanning direction.

27. The method according to claim 21, wherein the step of adjusting the focal position of the light beam on the surface to be scanned includes adjusting a lens element having power in the sub scanning direction only so as to adjust the beam spot diameter in the sub scanning direction.

28. The method according to claim 21, wherein the step of adjusting the focal position of the light beam on the surface to be scanned includes adjusting at least one of two lens elements after detecting at least three successive scans of beam spots on the surface to be scanned.

* * * * *

UNITED STATES PATENT AND TRADEMARK OFFICE
CERTIFICATE OF CORRECTION

PATENT NO.    : 6,417,509 B1
DATED         : July 9, 2002
INVENTOR(S)   : Hiromichi Atsuumi et al.

It is certified that error appears in the above-identified patent and that said Letters Patent is hereby corrected as shown below:

<u>Title page,</u>
Item [73], Assignee should read -- Ricoh Company, Ltd., Tokyo, Japan --.

Signed and Sealed this

Fourteenth Day of October, 2003

JAMES E. ROGAN
*Director of the United States Patent and Trademark Office*